United States Patent
Park et al.

(10) Patent No.: US 10,666,082 B2
(45) Date of Patent: May 26, 2020

(54) WIRELESS POWER TRANSFER METHOD, APPARATUS AND SYSTEM

(71) Applicant: LG ELECTRONICS INC., Seoul (KR)

(72) Inventors: Yongcheol Park, Seoul (KR); Jaesung Lee, Seoul (KR); Jeongkyo Seo, Seoul (KR); Jungjoon Lee, Seoul (KR); Beomseok Chae, Seoul (KR); Jihyun Lee, Seoul (KR); Kyunghwan Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 217 days.

(21) Appl. No.: 15/319,980

(22) PCT Filed: Jun. 18, 2015

(86) PCT No.: PCT/KR2015/006202
§ 371 (c)(1),
(2) Date: Dec. 19, 2016

(87) PCT Pub. No.: WO2015/194889
PCT Pub. Date: Dec. 23, 2015

(65) Prior Publication Data
US 2017/0141604 A1    May 18, 2017

Related U.S. Application Data

(60) Provisional application No. 62/015,028, filed on Jun. 20, 2014, provisional application No. 62/022,036, filed on Jul. 8, 2014.

(30) Foreign Application Priority Data

May 27, 2015  (KR) .................. 10-2015-0074230
Jun. 5, 2015   (KR) .................. 10-2015-0080140

(51) Int. Cl.
*H02J 7/02*    (2016.01)
*H04B 5/00*   (2006.01)
(Continued)

(52) U.S. Cl.
CPC ............. *H02J 7/025* (2013.01); *B60L 53/12* (2019.02); *H02J 50/12* (2016.02); *H02J 50/40* (2016.02);
(Continued)

(58) Field of Classification Search
CPC .. H02J 7/025; H02J 50/12; H02J 50/40; H02J 50/60; H04B 5/0031; H04B 5/0037; H04B 5/0081
(Continued)

(56) References Cited

U.S. PATENT DOCUMENTS 9,042,833 B1 * 5/2015 Jayaraj ................ H04B 1/3838
                                                        455/101
2006/0071632 A1  4/2006 Ghabra et al.
(Continued)

FOREIGN PATENT DOCUMENTS

JP    2011-142769 A    7/2011
JP    2012-175763 A    9/2012
(Continued)

*Primary Examiner* — Richard Isla
*Assistant Examiner* — Johali A Torres Ruiz
(74) *Attorney, Agent, or Firm* — Birch, Stewart, Kolasch & Birch, LLP

(57) ABSTRACT

The present disclosure relates to a foreign object detection method of a wireless power transmitter, and the method may include acquiring the frequency characteristics of a current flowing through a coil within the wireless power transmitter, comparing a peak frequency with a resonant frequency, and detecting whether or not the foreign object is placed on the transmitter through the comparison. In addition, the present disclosure relates to an interference avoidance method of a (Continued)

wireless power transmitter, and the method may include connecting a head unit of an automobile in a wireless manner through a communication device, receiving a first signal for avoiding interference from the head unit to stop wireless charging or change a first frequency band to a second frequency band, and receiving a second signal from the head unit to resume the wireless charging or change to the first frequency band.

9 Claims, 23 Drawing Sheets

(51) Int. Cl.
*H02J 50/40* (2016.01)
*H02J 50/12* (2016.01)
*B60L 53/12* (2019.01)
*H02J 50/60* (2016.01)

(52) U.S. Cl.
CPC ............ *H02J 50/60* (2016.02); *H04B 5/0031* (2013.01); *H04B 5/0037* (2013.01); *H04B 5/0081* (2013.01); *B60Y 2300/91* (2013.01)

(58) Field of Classification Search
USPC .......................................................... 320/108
See application file for complete search history.

(56) References Cited

U.S. PATENT DOCUMENTS

| | | | |
|---|---|---|---|
| 2009/0026844 A1 | 1/2009 | Iisaka et al. | |
| 2012/0001493 A1* | 1/2012 | Kudo | H02J 5/005 307/104 |
| 2012/0280574 A1 | 11/2012 | Hur et al. | |
| 2013/0127259 A1* | 5/2013 | Lohr | H01F 38/14 307/104 |
| 2013/0257168 A1 | 10/2013 | Singh | |
| 2014/0159500 A1* | 6/2014 | Sankar | H02J 50/12 307/104 |
| 2014/0167704 A1* | 6/2014 | Lafontaine | G01R 25/00 320/137 |
| 2015/0380978 A1* | 12/2015 | Toivola | H02J 7/04 320/108 |

FOREIGN PATENT DOCUMENTS

| | | |
|---|---|---|
| KR | 10-2012-0124560 A | 11/2012 |
| KR | 10-2014-0007273 A | 1/2014 |
| WO | WO 2012/082858 A1 | 6/2012 |
| WO | WO 2012/162288 A1 | 11/2012 |
| WO | WO 2013/038808 A1 | 3/2013 |
| WO | WO 2013/103943 A1 | 7/2013 |
| WO | WO 2013/121723 A2 | 8/2013 |

\* cited by examiner

[Fig. 1]
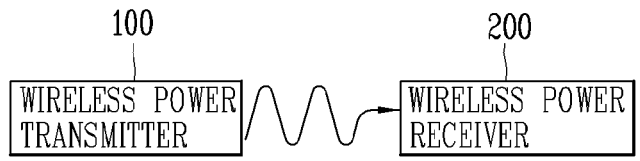
[Fig. 2a]
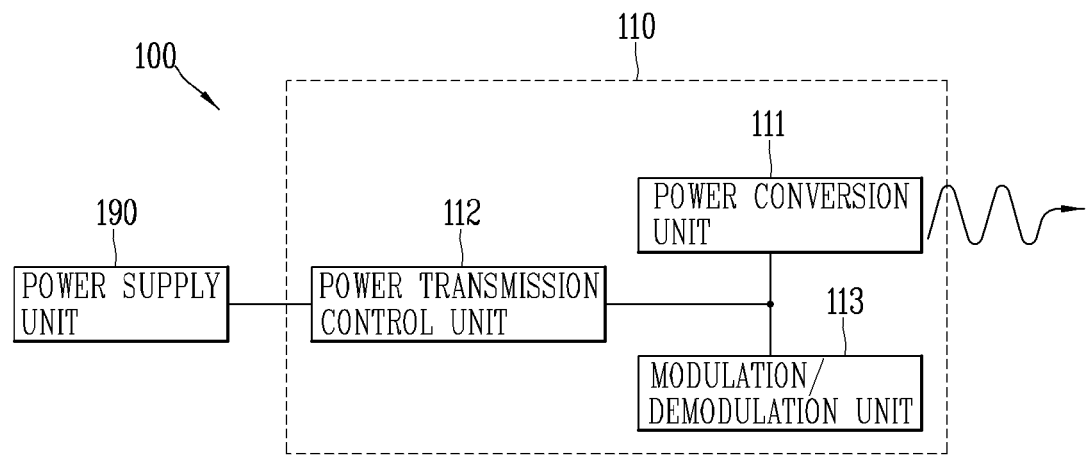
[Fig. 2b]
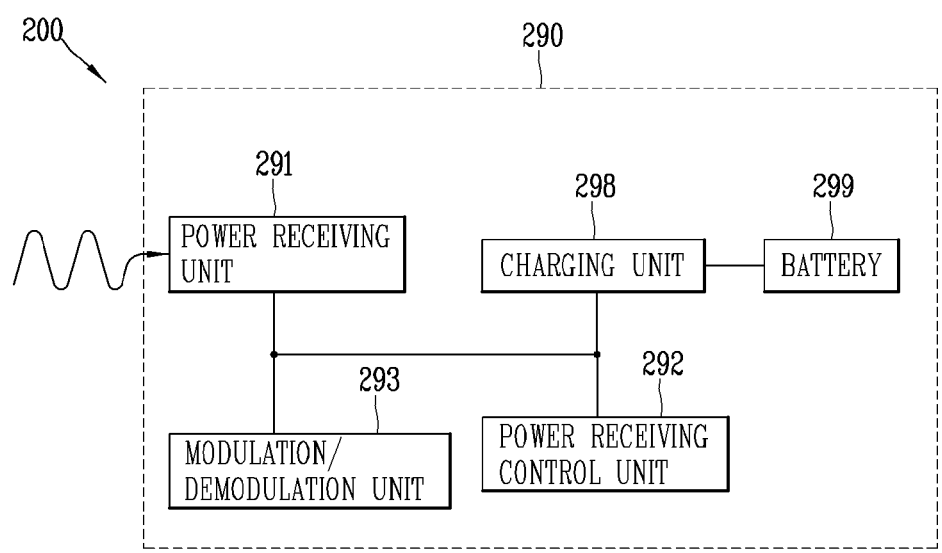

[Fig. 3]
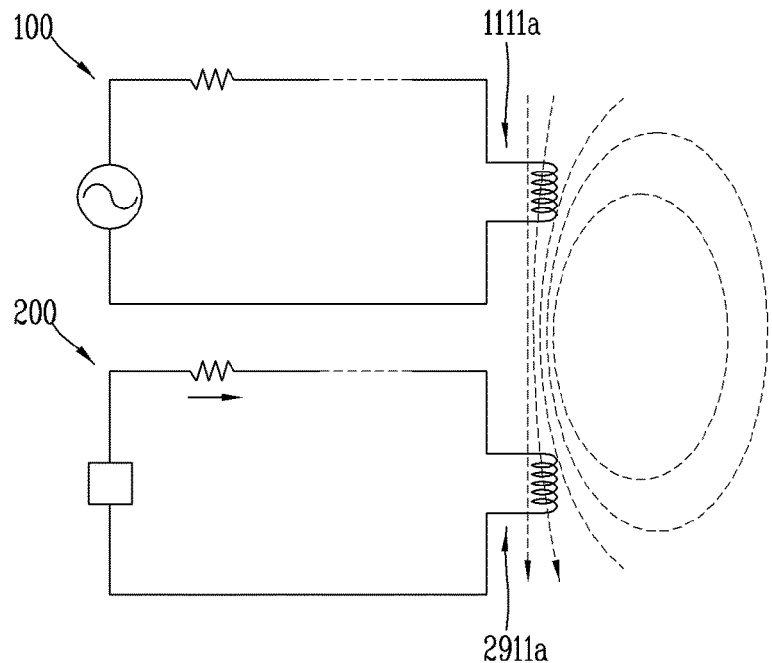
[Fig. 4a]
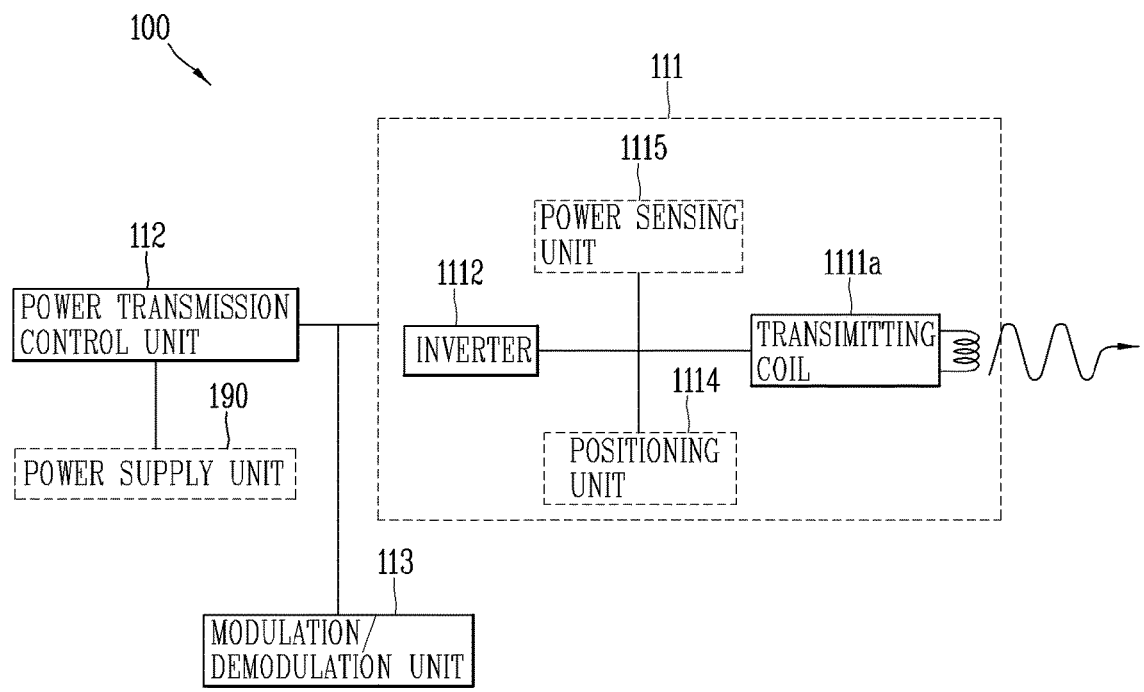

[Fig. 4b]
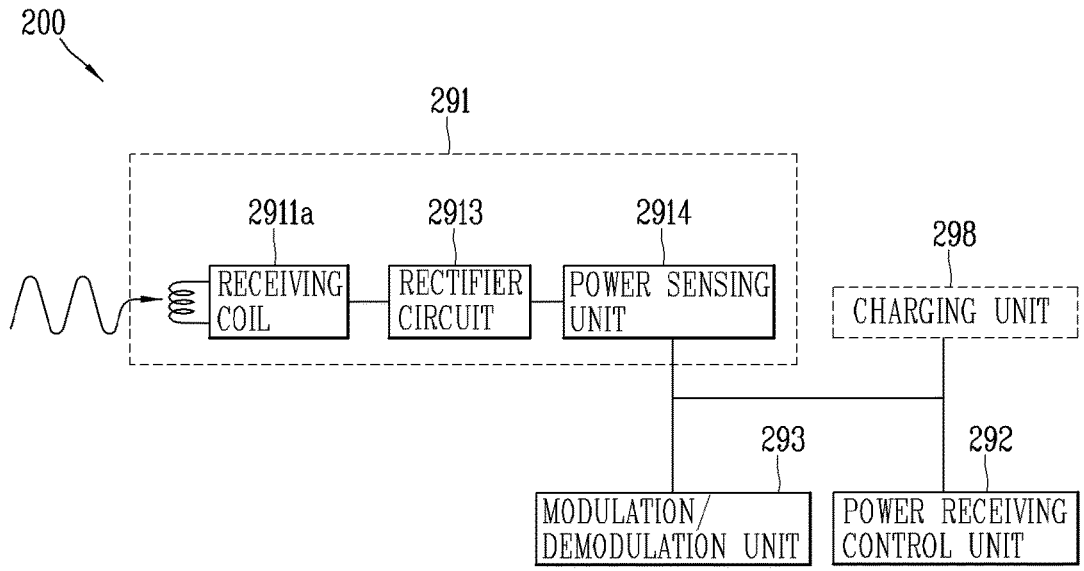
[Fig. 5]
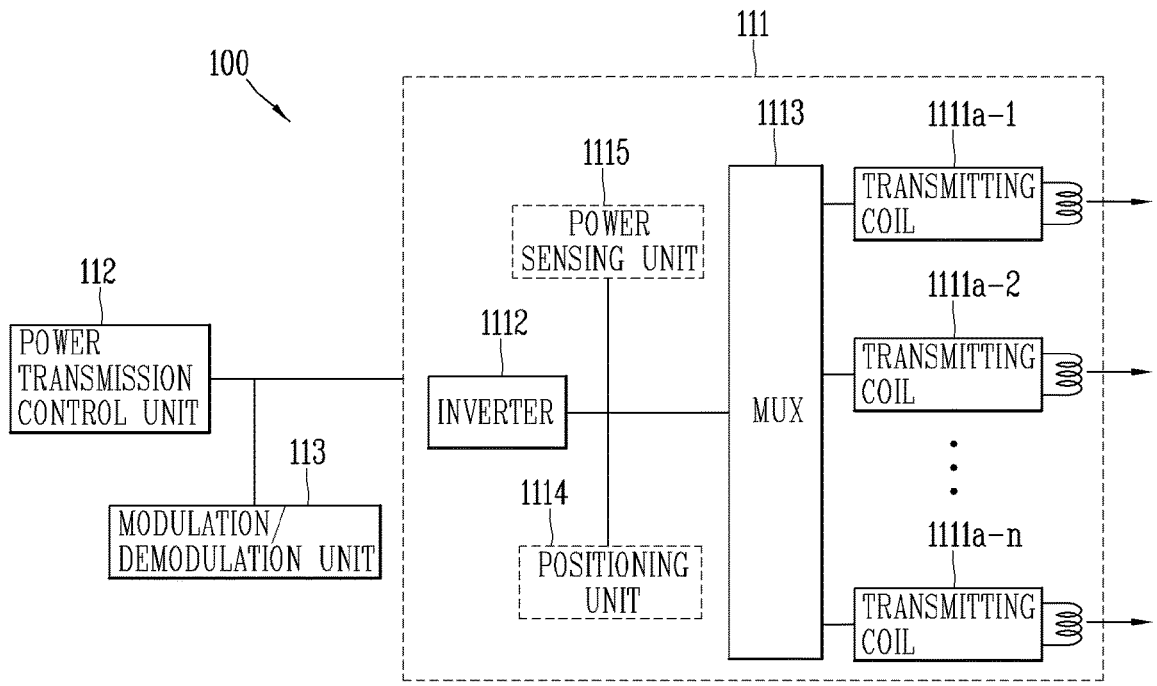

[Fig. 6]
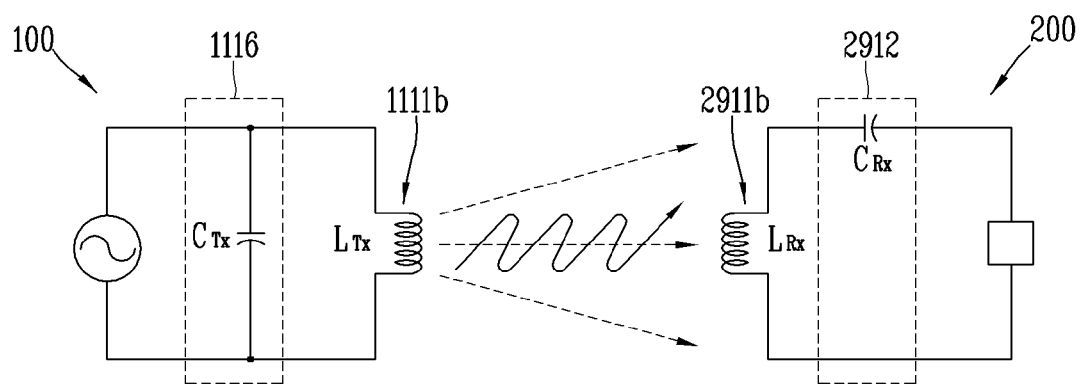

[Fig. 7a]
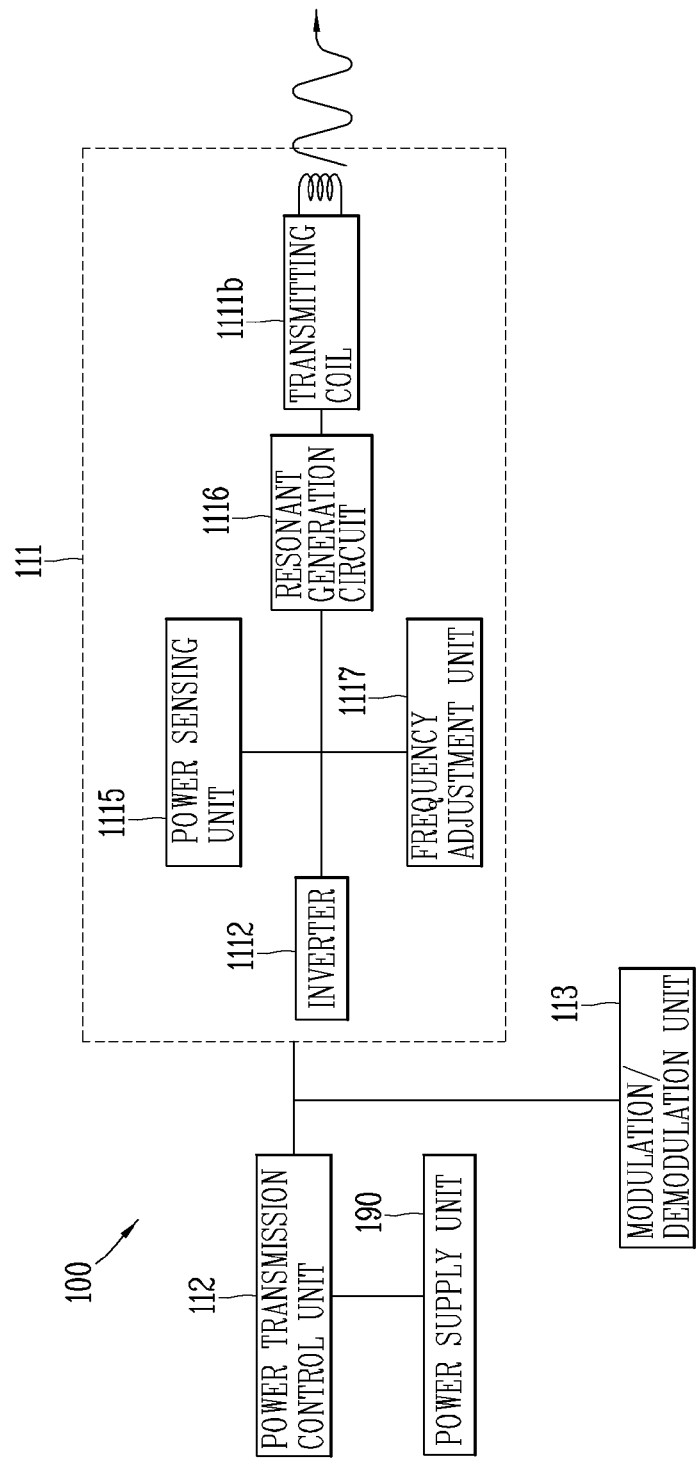

[Fig. 7b]
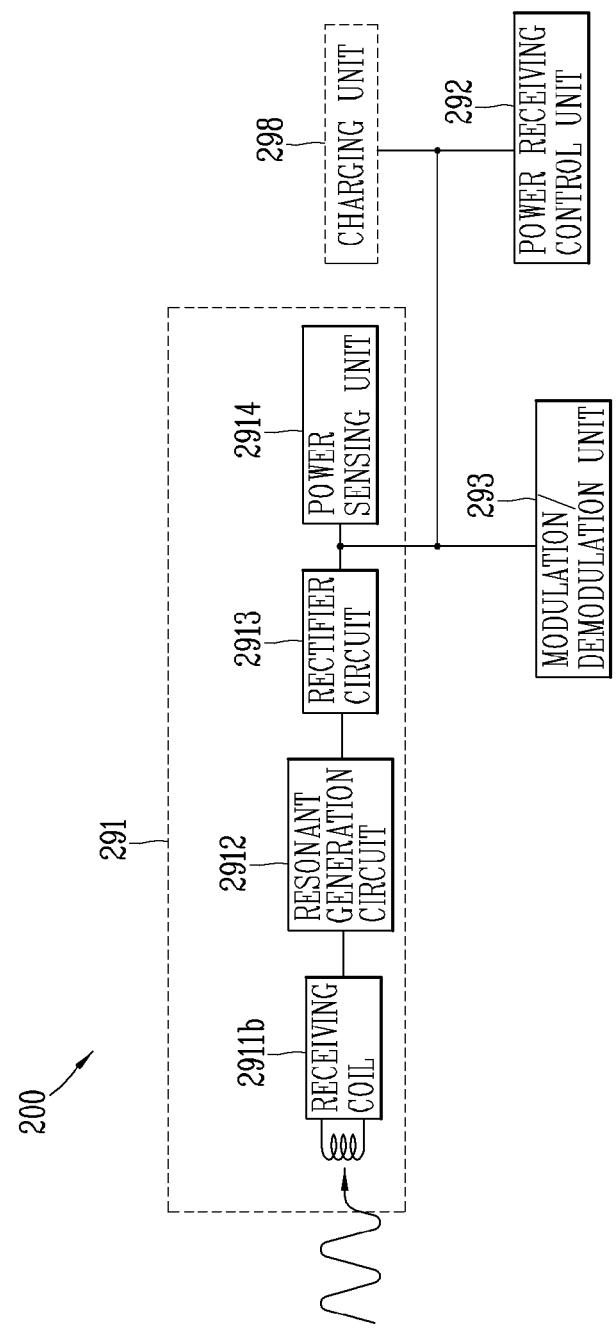

[Fig. 8]
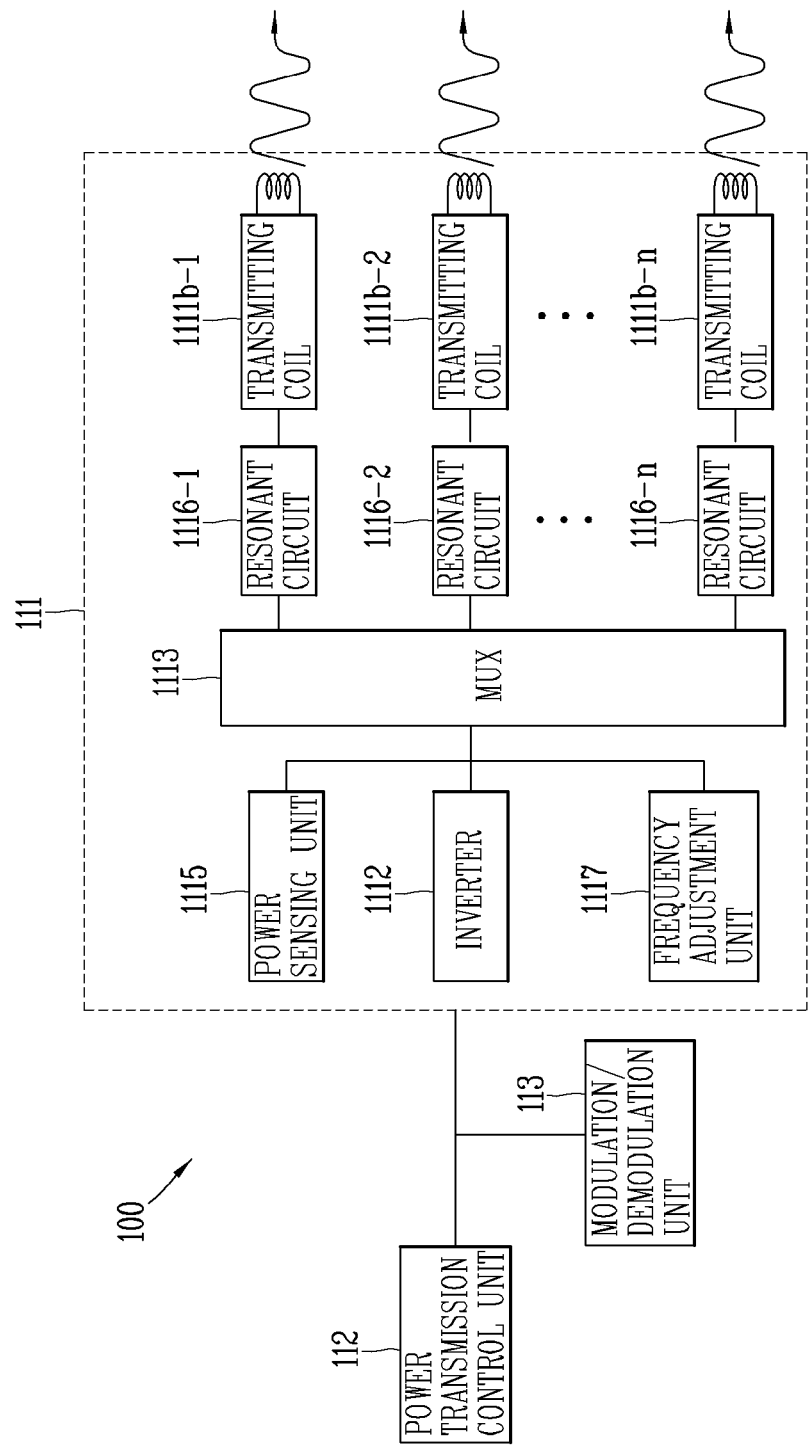

[Fig. 9]
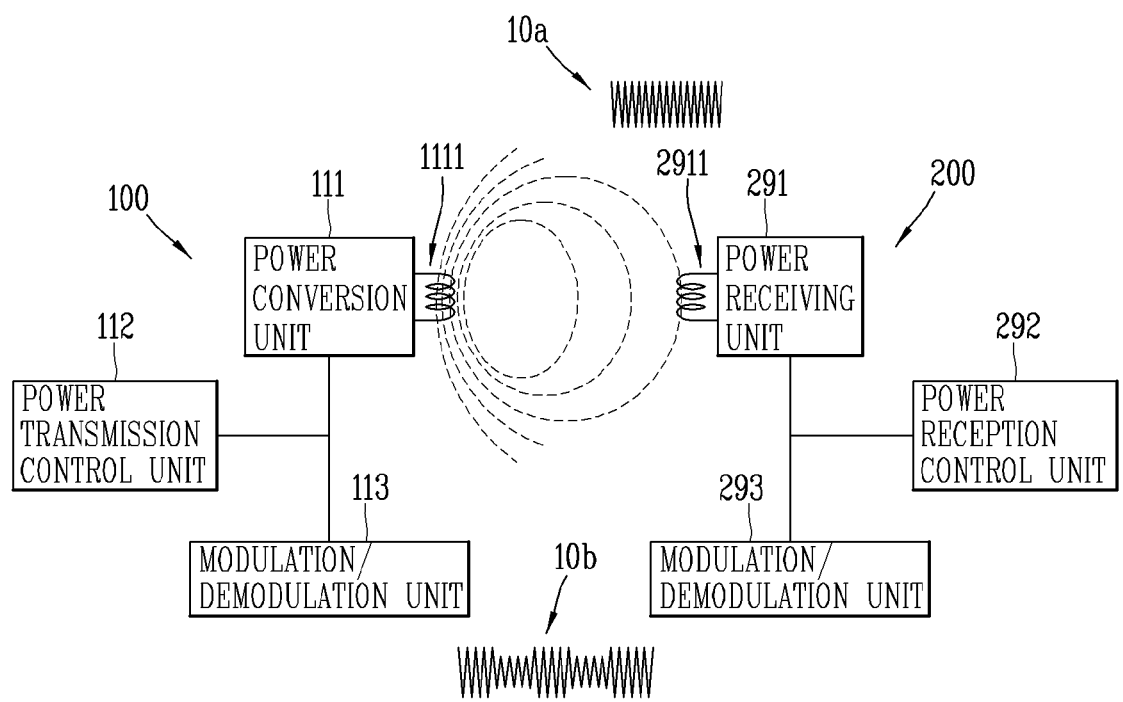

[Fig. 10]
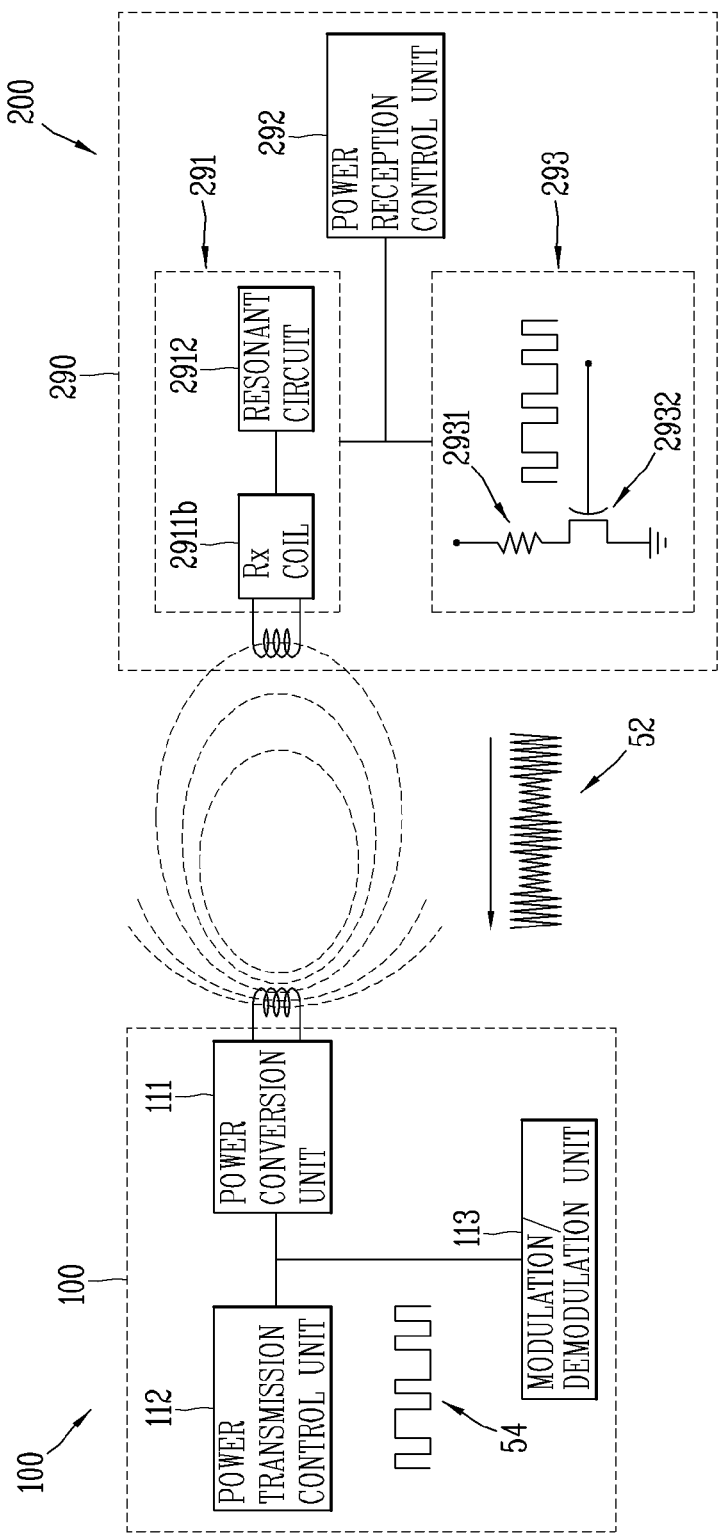

[Fig. 11a]
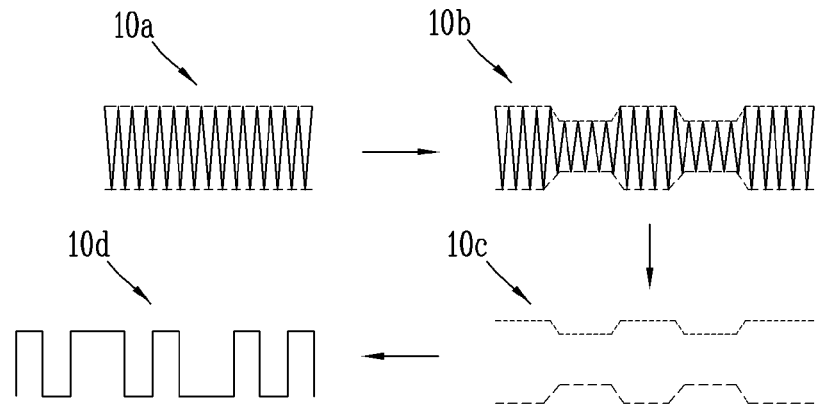
[Fig. 11b]
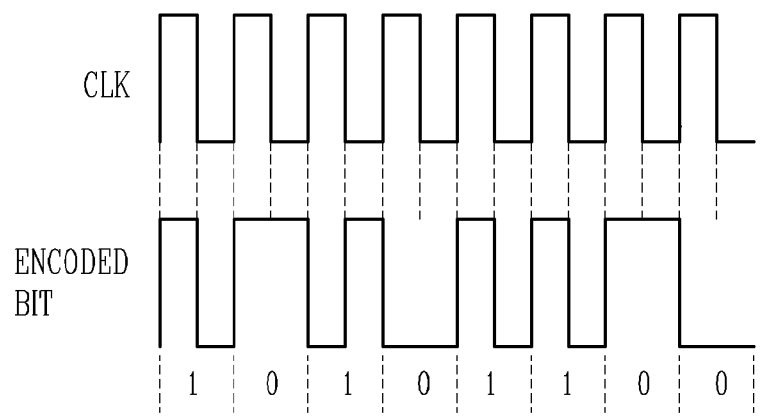
[Fig. 11c]
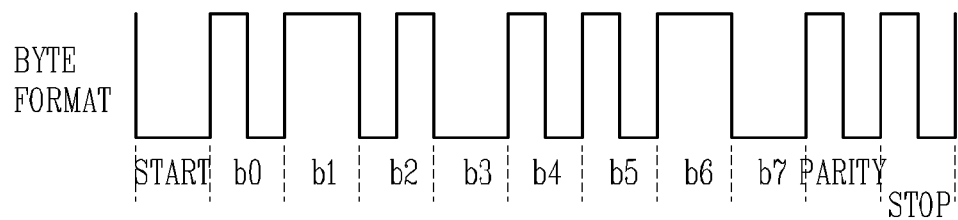
[Fig. 12a]
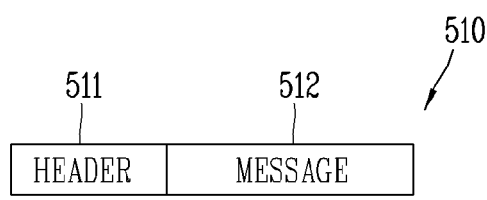

[Fig. 12b]
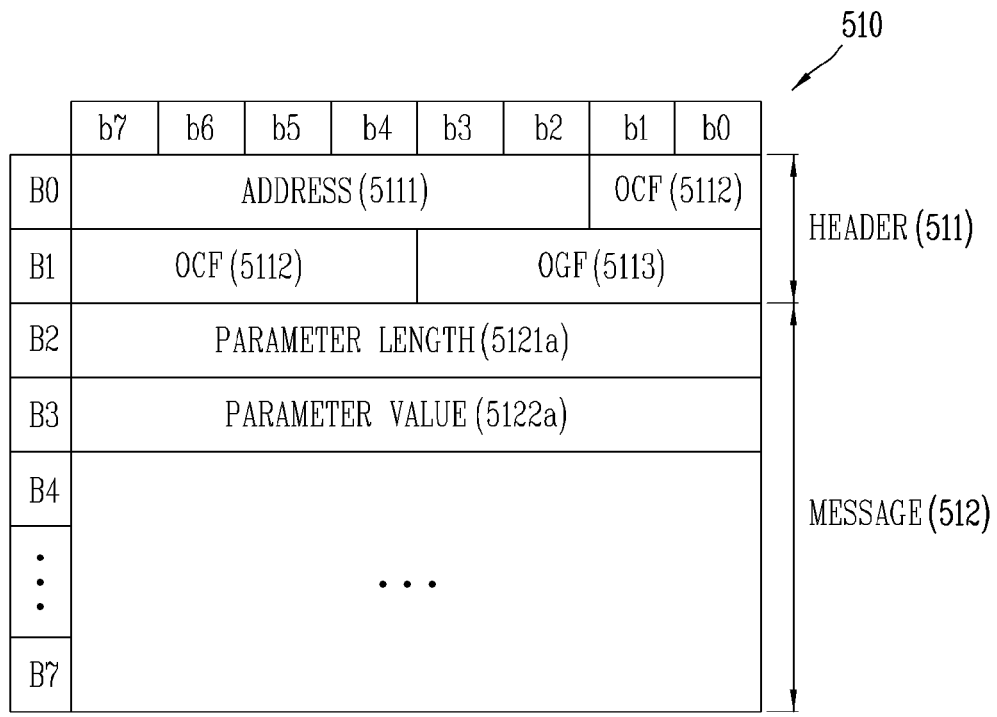
[Fig. 12c]
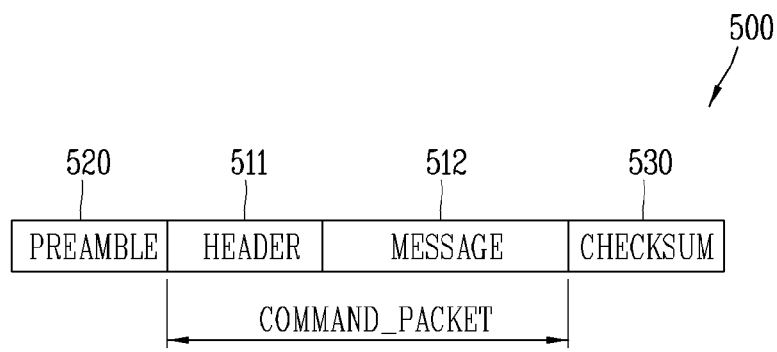

[Fig. 13]
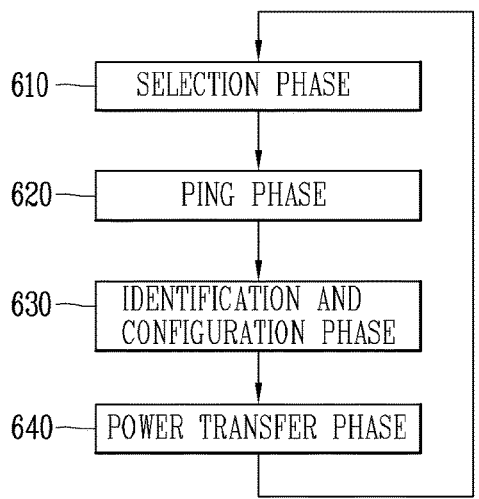
[Fig. 14]
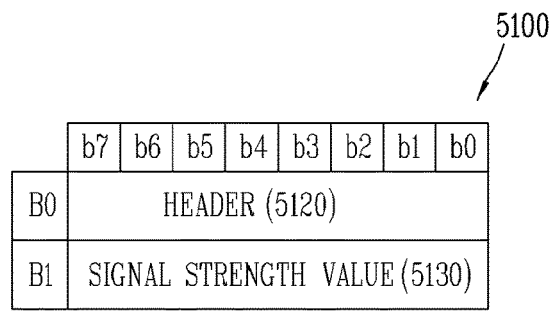
[Fig. 15a]
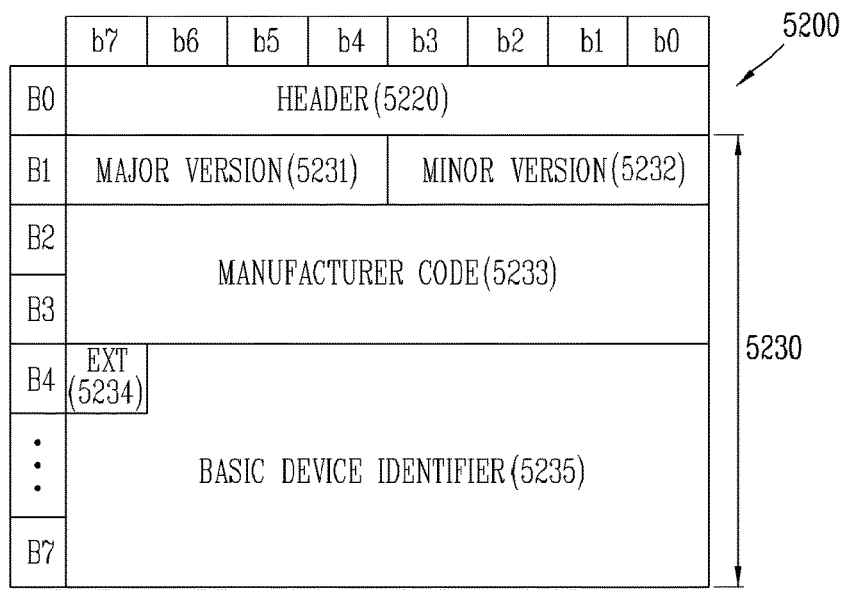

[Fig. 15b]
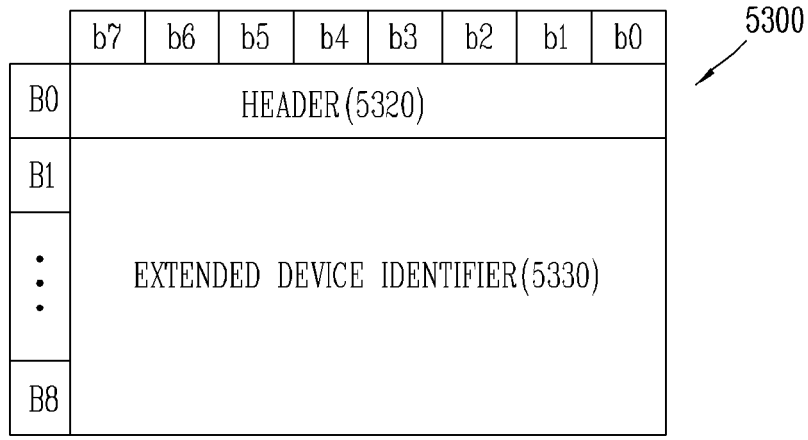
[Fig. 16]
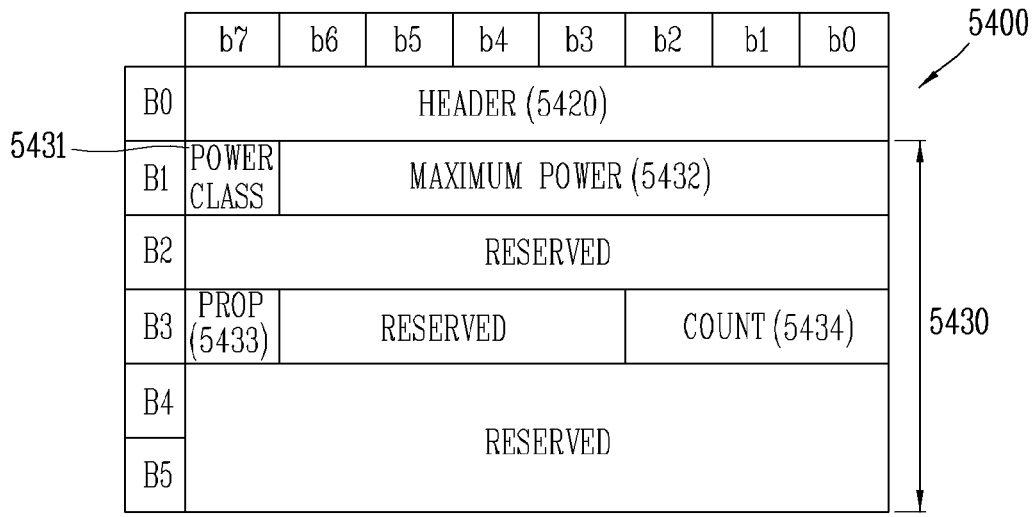
[Fig. 17]
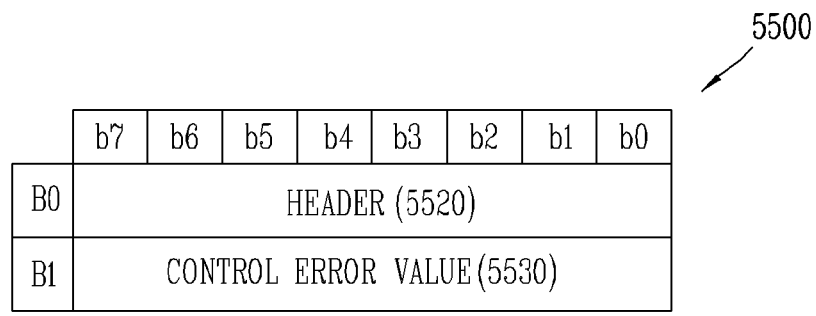

[Fig. 18]
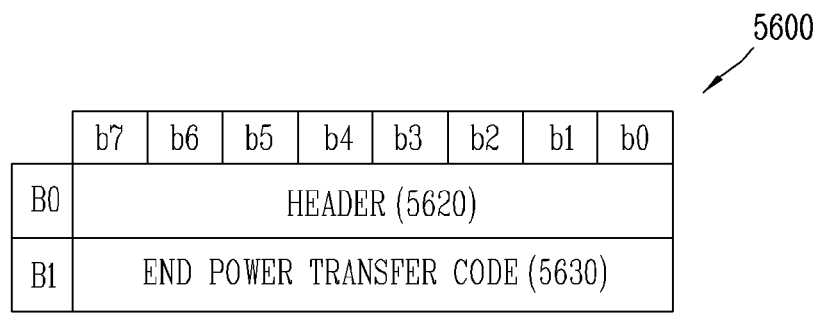

[Fig. 19]
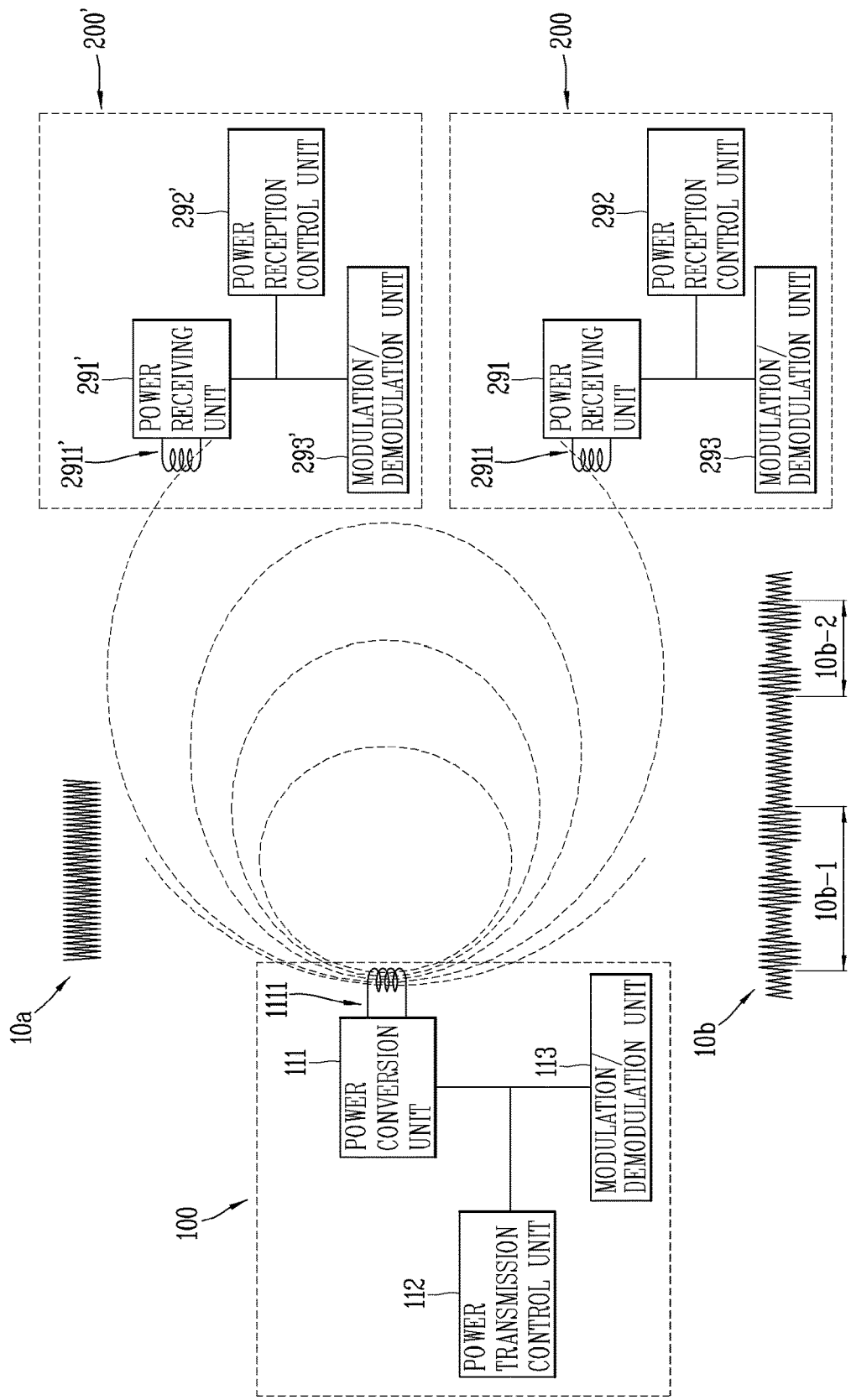

[Fig. 20]
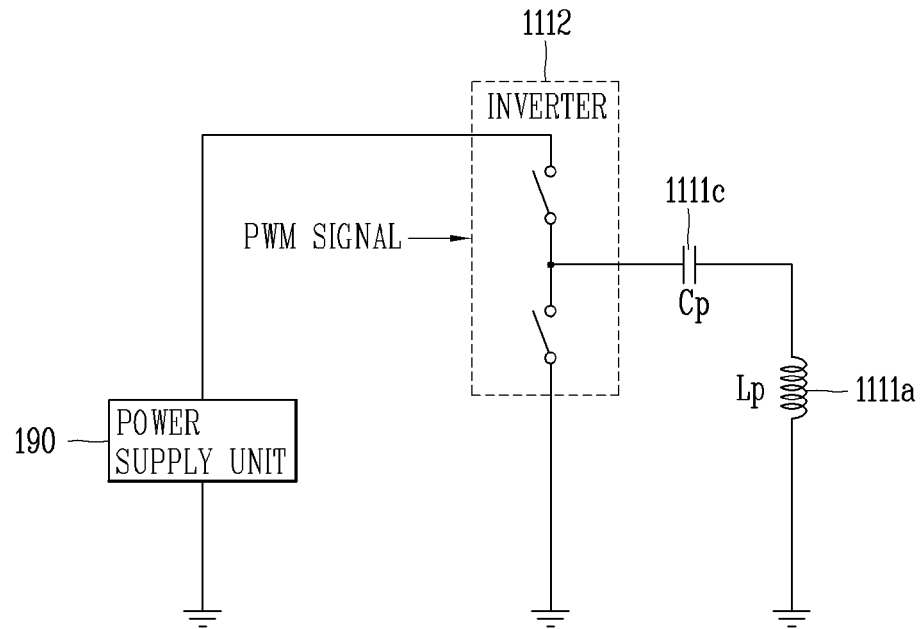
[Fig. 21]
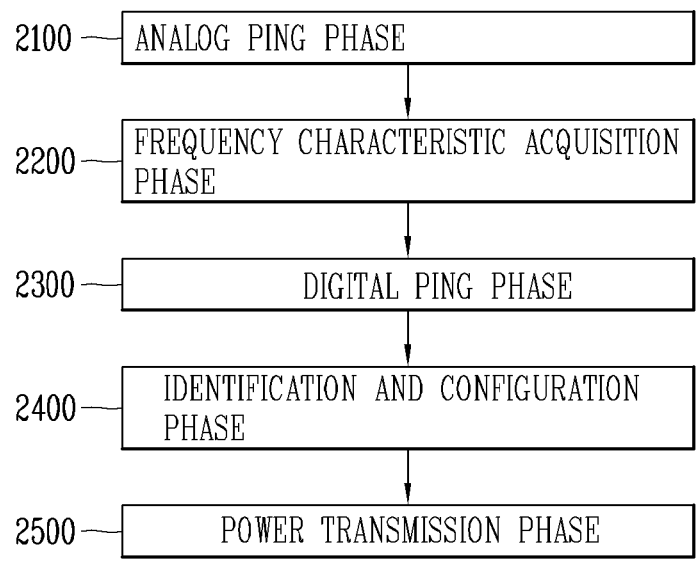

[Fig. 22]
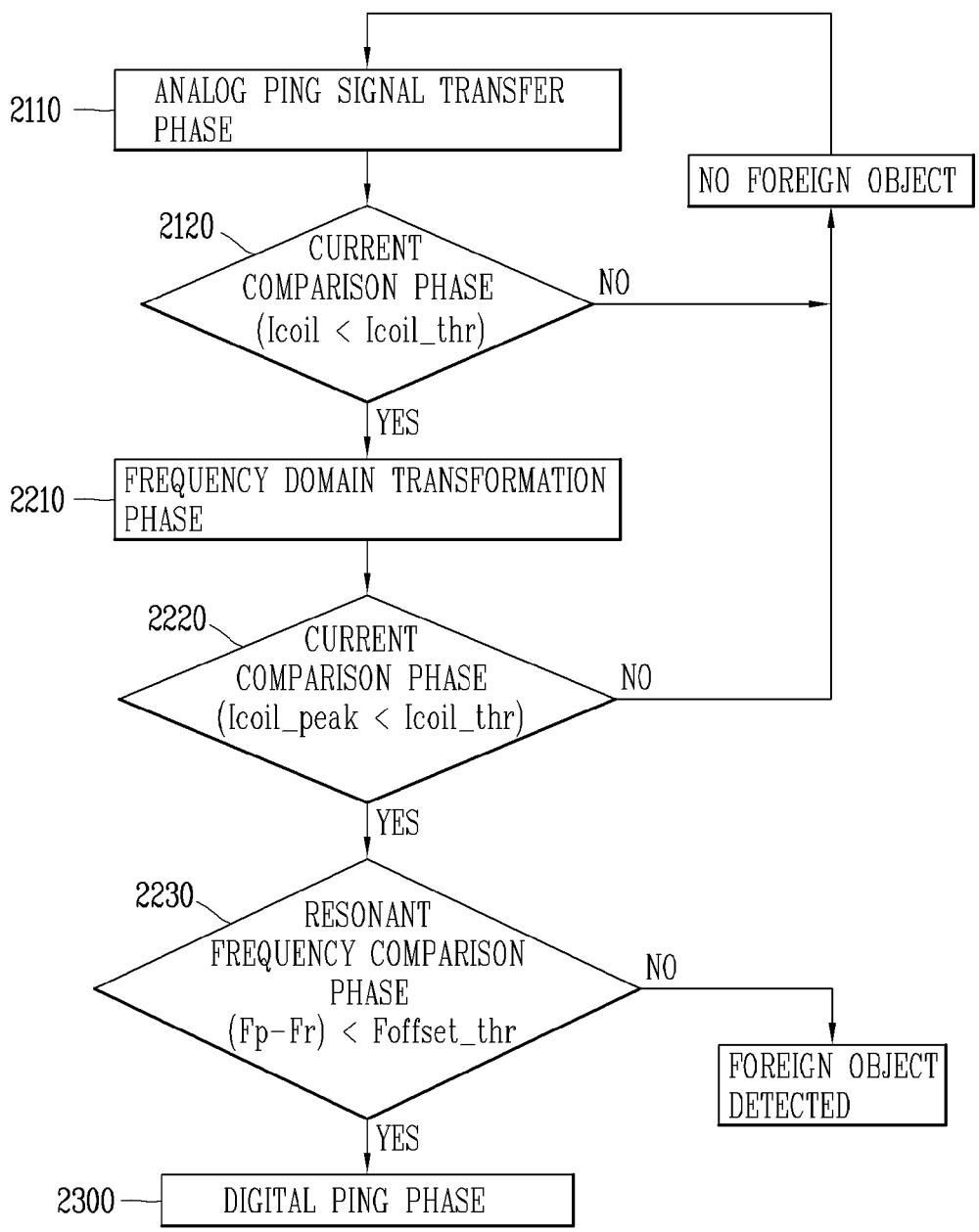

[Fig. 23a]
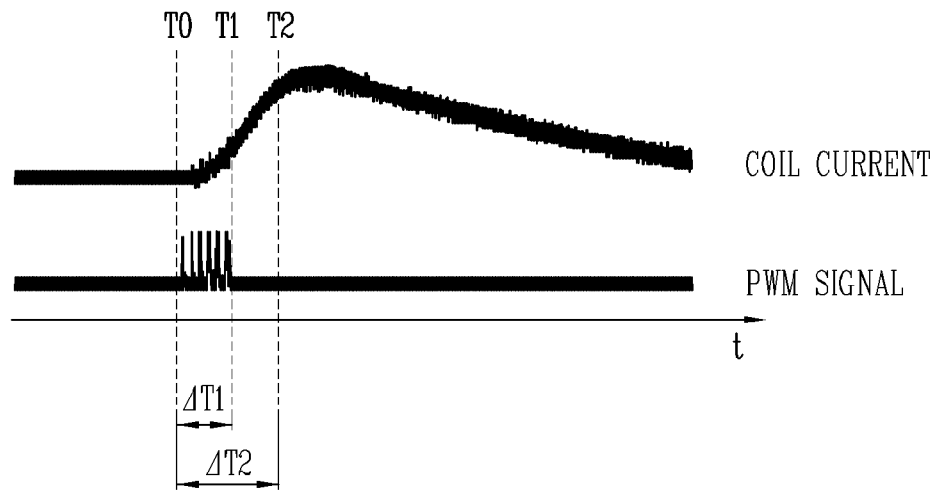
[Fig. 23b]
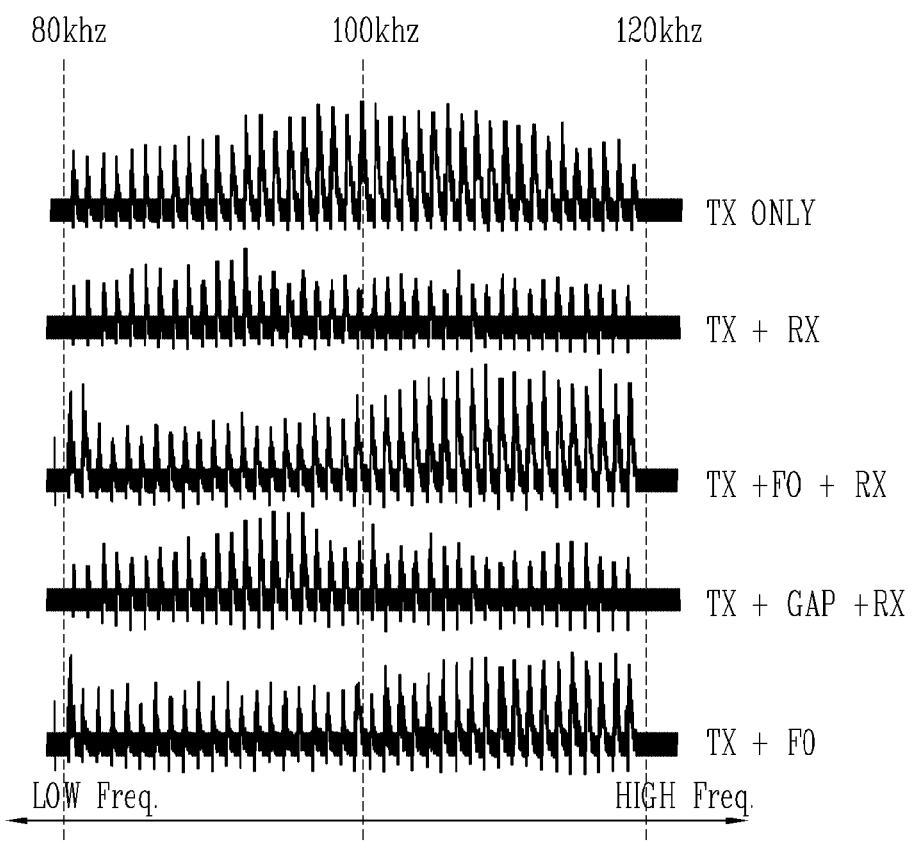

[Fig. 24a]
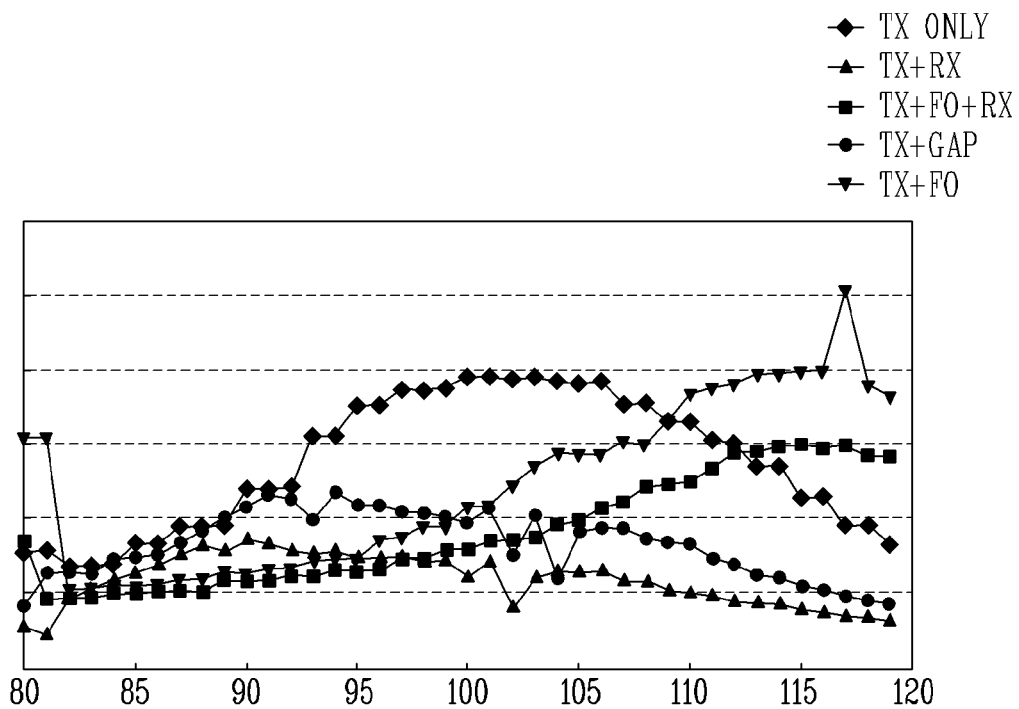
[Fig. 24b]
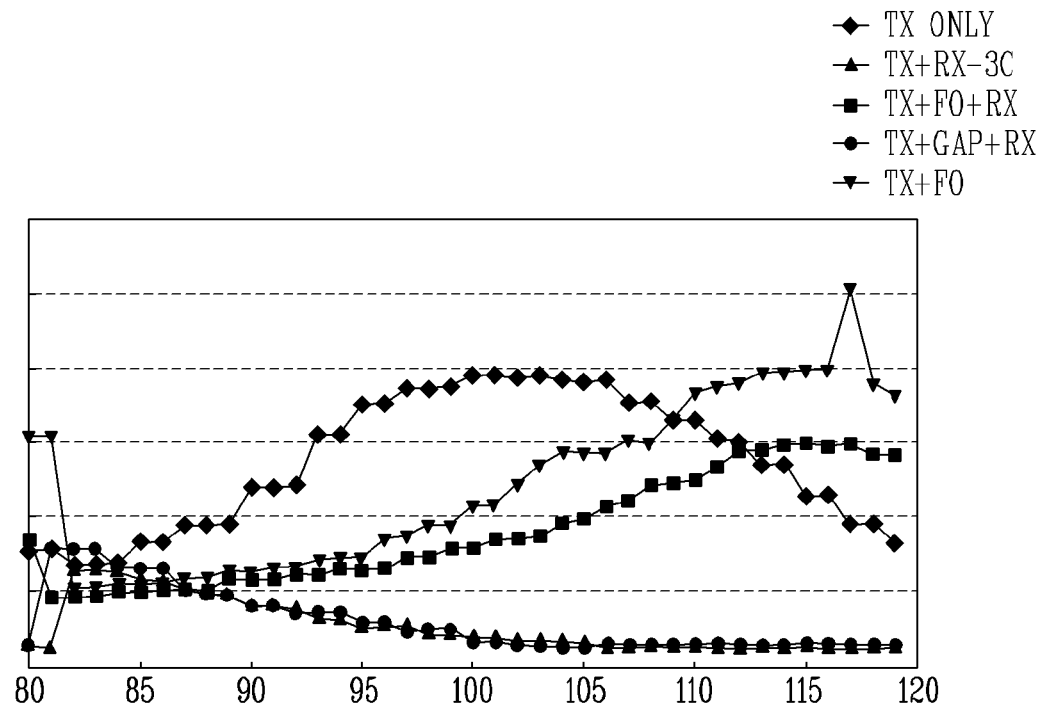

[Fig. 25]
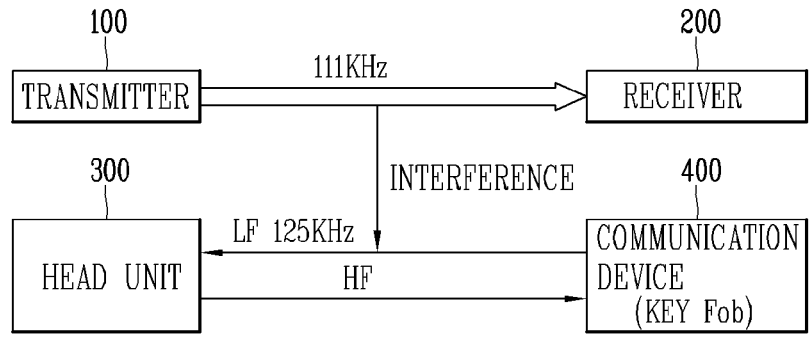
[Fig. 26]
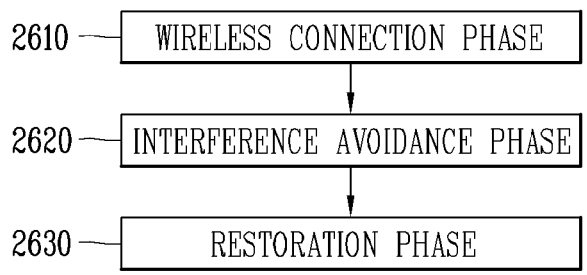
[Fig. 27]
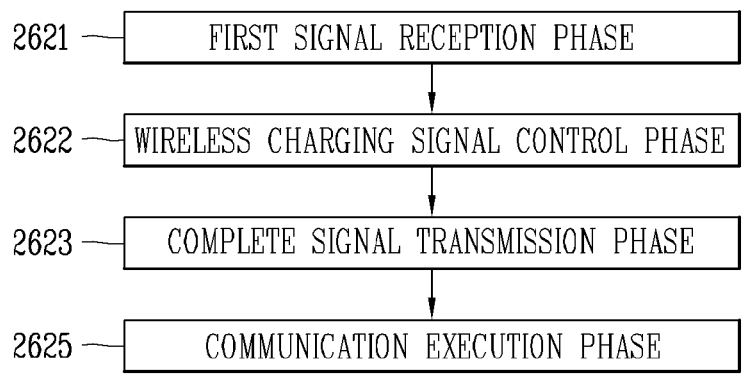

[Fig. 28]
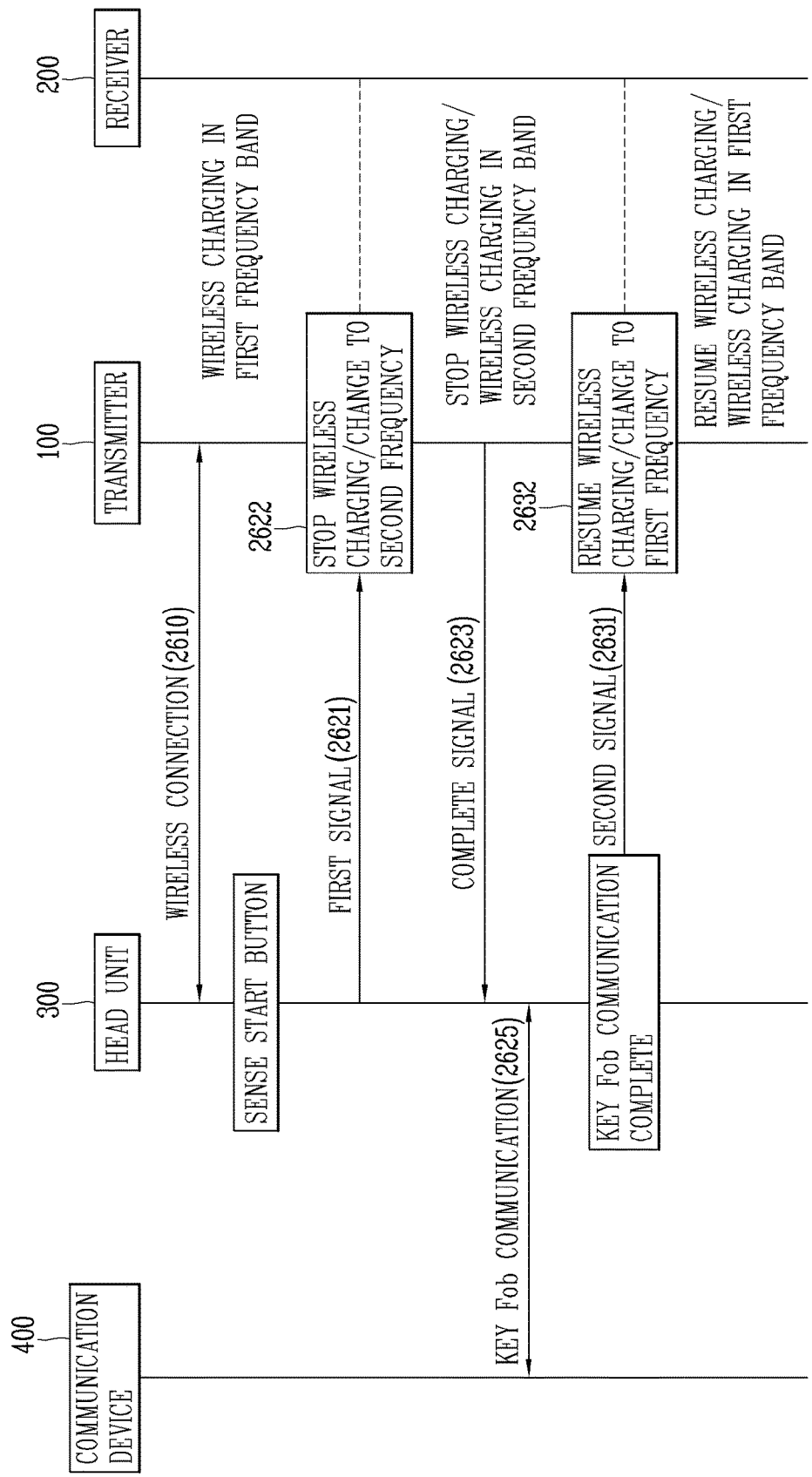

[Fig. 29]
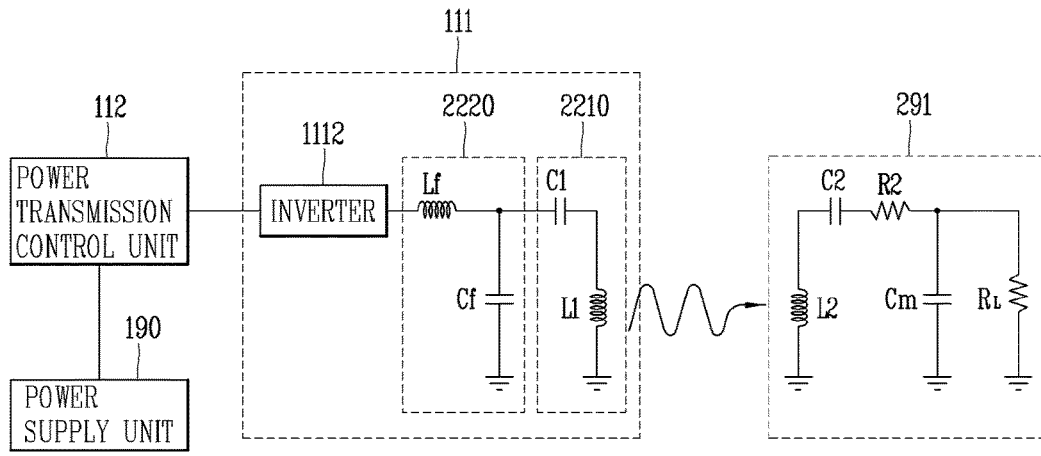
[Fig. 30]
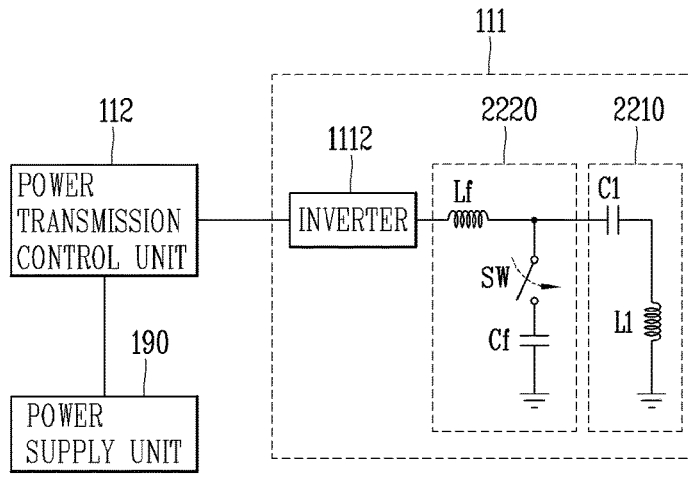
[Fig. 31a]
| Freq. (KHz) | LOAD(A) CONNECTED IN RX | | | |
|---|---|---|---|---|
| | OFF | 0.1 | 0.2 | 0.6 |
| 160 | × | × | × | × |
| 170 | × | × | × | × |
| 180 | × | × | × | × |
| 190 | × | × | × | × |
| 200 | × | × | × | × |
| 205 | ○ (4.7V) | × | × | × |
| 210 | ○ | × | × | × |
| 215 | ○ | ○ (1.12V) | × | × |
| 220 | ○ | ○ | ○ (1.15V) | × |

[Fig. 31b]

| Freq. (KHz) | LOAD(A) CONNECTED IN RX | | | |
|---|---|---|---|---|
| | OFF | 0.1 | 0.2 | 0.6 |
| 160 | × | × | × | × |
| 170 | × | × | × | × |
| 180 | ○ | × | × | × |
| 190 | ○ | × | × | × |
| 200 | ○ | ○ | × | × |
| 210 | ○ | ○ | ○ | × |
| 220 | ○ | ○ | ○ | ○ |
| 230 | ○ | ○ | ○ | ○ |
| 240 | ○ | ○ | ○ | ○ |
| 250 | ○ | ○ | ○ | ○ |
| 260 | ○ | ○ | ○ | ○ |

WIRELESS POWER TRANSFER METHOD, APPARATUS AND SYSTEM

CROSS REFERENCE TO RELATED APPLICATIONS

This application is the National Phase of PCT International Application No. PCT/KR2015/006202, filed on Jun. 18, 2015, which claims priority under 35 U.S.C. 119(e) to U.S. Provisional Application No. 62/015,028, filed on Jun. 20, 2014 and 62/022,036, filed on Jul. 8, 2014, and under 35 U.S.C. 119(a) to Patent Application Nos. 10-2015-0080140, filed in Republic of Korea on Jun. 5, 2015 and 10-2015-0074230, filed in Republic of Korea on May 27, 2015, all of which are hereby expressly incorporated by reference into the present application.

TECHNICAL FIELD

The present disclosure relates to a wireless power reception method, a wireless power reception apparatus, and a wireless charging system in a wireless power transmission and reception field.

BACKGROUND ART

In recent years, the method of contactlessly supplying electrical energy to wireless power receivers in a wireless manner has been used instead of the traditional method of supplying electrical energy in a wired manner. The wireless power receiver receiving energy in a wireless manner may be directly driven by the received wireless power, or a battery may be charged by using the received wireless power, then allowing the wireless power receiver to be driven by the charged power.

For allowing smooth wireless power transfer between a wireless power transmitter which transmits power in a wireless manner and a wireless power receiver which receives power in a wireless manner, the standardization for a technology related to the wireless power transfer is undergoing.

As part of the standardization for the wireless power transfer technology, the Wireless Power Consortium (WPC) which manages technologies for a magnetic inductive wireless power transfer has published a standard document "System description Wireless Power Transfer, Volume 1, Low Power, Part 1: Interface Definition, Version 1.00 Release Candidate 1 (RC1)" for interoperability in the wireless power transfer on Apr. 12, 2010.

On the other hand, Power Matters Alliance as another technology standardization consortium has been established in March 2012, developed a product line of interface standards, and published a standard document based on an inductive coupling technology for providing inductive and resonant power.

A wireless charging method using electromagnetic induction is frequently encountered in our lives, and for example, is utilized by being commercialized in electric tooth brushes, wireless coffee ports and the like.

On the other hand, a wireless power transmitter may be required to determine whether or not a foreign object is placed thereon prior to transmitting power when the foreign object other than a wireless power receiver is placed on the wireless power transmitter formed to transmit power to the wireless power receiver in a wireless manner.

Accordingly, the present disclosure provides a foreign object detection method of a wireless power transmitter formed to transmit power to a wireless power receiver in a wireless manner.

On the other hand, a wireless power transmitter formed to transmit power to a wireless power receiver in a wireless manner may be required even in an automobile. In this case, when the frequencies of wireless signals between communication devices such as a head unit, a keyfob, and the like in an automobile partially overlap with or very close to those of wireless charging signals between the wireless power transmitter and the wireless power receiver, it may be required to determine whether or not there is any mutual interference to avoid the interference.

Consequently, the present disclosure provides an interference avoidance method of a wireless power transmitter formed to transmit power to a wireless power receiver in a wireless manner, and a method of controlling the wireless charging of an automobile provided with a wireless power transmitter formed to transmit power to a wireless power receiver in a wireless manner and a head unit.

DISCLOSURE OF INVENTION

Technical Problem

An aspect of the present disclosure is to provide a method of allowing a wireless power transmitter to determine whether or not a foreign object is placed thereon prior to transmitting power when the foreign object other than a wireless power receiver is placed on the wireless power transmitter formed to transmit power to the wireless power receiver in a wireless manner.

An another aspect of the present disclosure is to provide a method of allowing a wireless power transmitter to avoid interference due to communication between a head unit and a communication device in the wireless power transmitter performing communication with a wireless power receiver.

Solution to Problem

There is provided a foreign object detection method of a wireless power transmitter formed to transmit power to a wireless power receiver in a wireless manner, and the method may include acquiring the frequency characteristics of a current flowing through a coil within the wireless power transmitter for a predetermined period of time, detecting a peak frequency corresponding to a peak value using the acquired frequency characteristics, and comparing the peak frequency with a resonant frequency of the wireless power transmitter, and detecting whether or not the foreign object is placed on the transmitter through the comparison.

According to an embodiment, the method may further include transmitting an analog ping signal to the receiver prior to acquiring the frequency characteristics of the current, and determining that the foreign object is not placed thereon when a current flowing through the coil is above a first threshold value.

According to an embodiment, said comparing the first frequency with the resonant frequency may include determining whether or not the peak value of the current is below a second threshold value, and determining that the foreign object is placed thereon when a difference between the peak frequency and the resonant frequency is above a threshold frequency which is a frequency tolerance for determining that the receiver is placed thereon.

According to an embodiment, the method may further include transmitting a digital ping signal to the receiver subsequent to detecting that the foreign object is placed thereon.

According to an embodiment, a current flowing through the coil may be generated by a pulse width modulation (PWM) signal applied to an inverter within the transmitter.

According to an embodiment, the pulse width modulation (PWM) signal may be generated for a reference period of time, and the reference period of time may be shorter than the predetermined period of time.

There is provided an interference avoidance method of a wireless power transmitter formed to transmit power to a wireless power receiver in a wireless manner, and the interference avoidance method may include connecting a head unit of an automobile in a wireless manner through a communication device, receiving a first signal for avoiding interference from the head unit to stop wireless charging or change a first frequency band of the wireless charging to a second frequency band which is a different frequency band, and receiving a second signal from the head unit to resume the wireless charging or change the second frequency band to the first frequency band.

According to an embodiment, said changing to the first frequency band may close a switch for turning on or off a coil formed to convert a current into a magnetic flux and a capacitor connected to the coil in parallel.

According to an embodiment, the method may further include changing to the first frequency band subsequent to receiving the second signal, wherein said changing to the first frequency band opens the switch.

There is provided a method of controlling the wireless charging of an automobile provided with a wireless power transmitter formed to transmit power to a wireless power receiver in a wireless manner and a head unit, and the method may include allowing the transmitter to receive a first signal from the head unit to avoid interference between a wireless signal for communication with a keyfob of the head unit and a transmission signal for the wireless charging of the transmitter, stopping the wireless charging or changing a first frequency band of the transmission signal to a second frequency band which is a different frequency band based on the control signal, and allowing the head unit to transmit the wireless signal to the keyfob.

According to an embodiment, the method may further include allowing the transmitter to receive a second signal from the head unit to resume the wireless charging or change the second frequency band to the first frequency band.

According to an embodiment, said changing to the second frequency band may close a switch for turning on or off a coil formed to convert a current into a magnetic flux and a capacitor connected to the coil in parallel.

According to an embodiment, the method may further include changing to the first frequency band subsequent to receiving the second signal, wherein said changing to the first frequency band opens the switch.

Advantageous Effects of Invention

Through this, the present disclosure may detect that a foreign object is placed on a wireless power transmitter formed to transmit power to a wireless power receiver in a wireless manner.

Through this, the present disclosure may allow a wireless power transmitter to avoid interference due to communication between a head unit and a communication device in the wireless power transmitter performing communication with a wireless power receiver.

BRIEF DESCRIPTION OF DRAWINGS

FIG. 1 is an exemplary view conceptually illustrating a wireless power transmitter and a wireless power receiver according to the embodiments of the present invention.

FIGS. 2A and 2B are exemplary block diagrams illustrating the configuration of a wireless power transmitter and a wireless power receiver that can be employed in the embodiments disclosed herein, respectively.

FIG. 3 is a view illustrating a concept in which power is transferred from a wireless power transmitter to a wireless power receiver in a wireless manner according to an inductive coupling method.

FIGS. 4A and 4B are block diagrams illustrating part of the wireless power transmitter and wireless power receiver in a magnetic induction method that can be employed in the embodiments disclosed herein.

FIG. 5 is a block diagram illustrating a wireless power transmitter configured to have one or more transmitting coils receiving power according to an inductive coupling method that can be employed in the embodiments disclosed herein.

FIG. 6 is a view illustrating a concept in which power is transferred to a wireless power receiver from a wireless power transmitter in a wireless manner according to a resonance coupling method.

FIGS. 7A and 7B are block diagrams illustrating part of the wireless power transmitter and wireless power receiver in a resonance method that can be employed in the embodiments disclosed herein.

FIG. 8 is a block diagram illustrating a wireless power transmitter configured to have one or more transmitting coils receiving power according to a resonance coupling method that can be employed in the embodiments disclosed herein.

FIG. 9 a view illustrating a concept of transmitting and receiving a packet between a wireless power transmitter and an electronic device through the modulation and demodulation of a wireless power signal in transferring power in a wireless manner disclosed herein.

FIG. 10 is a view illustrating a configuration of transmitting and receiving a power control message in transferring power in a wireless manner disclosed herein.

FIGS. 11A, 11B and 11C are views illustrating forms of signals upon modulation and demodulation executed in a wireless power transfer disclosed herein.

FIGS. 12A, 12B and 12C are views illustrating a packet including a power control message used in a wireless power transfer method according to the embodiments disclosed herein.

FIG. 13 is a view illustrating operation phases of the wireless power transmitter and wireless power receiver according to the embodiments disclosed herein.

FIGS. 14 to 18 are views illustrating the structure of packets including a power control message between the wireless power transmitter and the wireless power receiver.

FIG. 19 is a conceptual view illustrating a method of transferring power to at least one wireless power receiver from a wireless power transmitter.

FIG. 20 is a circuit diagram schematically illustrating part of the configuration of a wireless power transmitter in a magnetic induction mode that can be employed in the embodiments disclosed in the present disclosure.

FIGS. 21 and 22 are flow charts illustrating a foreign object detection method of a wireless power transmitter in a magnetic induction mode that can be employed in the embodiments disclosed in the present disclosure.

FIGS. 23A and 23B are views illustrating the time and frequency characteristics of a current within a transmitting coil, respectively, in a wireless power transmitter according to the present disclosure.

FIGS. 24A and 24B are views illustrating the frequency characteristics of a current within a transmitting coil in a wireless power transmitter for a low and medium power receiver.

FIG. 25 is a block diagram illustrating a wireless charging system including an automobile provided with a wireless power transmitter formed to transmit power to a wireless power receiver in a wireless manner and a head unit.

FIG. 26 illustrates a series of processes for avoiding interference between a wireless charging signal and a communication signal in a transmitter according to the present disclosure.

FIG. 27 illustrates a specific process in an interference avoidance step during the series of processes for avoiding interference between a wireless charging signal and a communication signal in the transmitter and head unit according to the present disclosure.

FIG. 28 is a signal flow diagram between a head unit, a communication device, a wireless power transmitter and a wireless power receiver in a wireless charging system.

FIG. 29 is a circuit diagram illustrating a wireless charging system including a wireless power transmitter and a wireless power receiver according to an embodiment of the present disclosure.

FIG. 30 is a circuit diagram illustrating a wireless power transmitter according to another embodiment of the present disclosure.

FIGS. 31A and 31B illustrate the operation or non-operation of a receiver according to a frequency change and load resistance change when a switch is in an off state and on state, respectively.

MODE FOR THE INVENTION

The technologies disclosed herein may be applicable to wireless power transmission (contactless power transmission). However, the technologies disclosed herein are not limited to this, and may be also applicable to all kinds of power transmission systems and methods, wireless charging circuits and methods to which the technological spirit of the technology can be applicable, in addition to the methods and apparatuses using power transmitted in a wireless manner.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Definition

Many-to-one communication: communicating between one transmitter (Tx) and many receivers (Rx)

Unidirectional communication: transmitting a required message only from a receiver to a transmitter Here, the transmitter and the receiver indicate the same as a transmitting unit (device) and a receiving unit (device), respectively. Hereinafter, those terms may be used together.

Conceptual View of Wireless Power Transmitter and Wireless Power Receiver

FIG. 1 is an exemplary view conceptually illustrating a wireless power transmitter and a wireless power receiver according to the embodiments of the present invention.

Referring to FIG. 1, the wireless power transmitter 100 may be a power transfer apparatus configured to transfer power required for the wireless power receiver 200 in a wireless manner.

Furthermore, the wireless power transmitter 100 may be a wireless charging apparatus configured to charge a battery of the wireless power receiver 200 by transferring power in a wireless manner. A case where the wireless power transmitter 100 is a wireless charging apparatus will be described later with reference to FIG. 9.

Additionally, the wireless power transmitter 100 may be implemented with various forms of apparatuses transferring power to the wireless power receiver 200 requiring power in a contactless state.

The wireless power receiver 200 is a device that is operable by receiving power from the wireless power transmitter 100 in a wireless manner. Furthermore, the wireless power receiver 200 may charge a battery using the received wireless power.

On the other hand, an electronic device for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The wireless power receiver 200, as described later, may be a mobile communication terminal (for example, a portable phone, a cellular phone, and a tablet and the like) or a multimedia device.

On the other hand, the wireless power transmitter 100 may transfer power in a wireless manner without mutual contact to the wireless power receiver 200 using one or more wireless power transfer methods. In other words, the wireless power transmitter 100 may transfer power using at least one of an inductive coupling method based on magnetic induction phenomenon by the wireless power signal and a magnetic resonance coupling method based on electromagnetic resonance phenomenon by a wireless power signal at a specific frequency.

Wireless power transfer in the inductive coupling method is a technology transferring power in a wireless manner using a primary coil and a secondary coil, and refers to the transmission of power by inducing a current from a coil to another coil through a changing magnetic field by a magnetic induction phenomenon.

Wireless power transfer in the inductive coupling method refers to a technology in which the wireless power receiver 200 generates resonance by a wireless power signal transmitted from the wireless power transmitter 100 to transfer power from the wireless power transmitter 100 to the wireless power receiver 200 by the resonance phenomenon.

Hereinafter, the wireless power transmitter 100 and wireless power receiver 200 according to the embodiments disclosed herein will be described in detail. In assigning reference numerals to the constituent elements in each of the following drawings, the same reference numerals will be used for the same constituent elements even though they are shown in a different drawing.

FIGS. 2A and 2B are exemplary block diagrams illustrating the configuration of a wireless power transmitter 100 and a wireless power receiver 200 that can be employed in the embodiments disclosed herein.

Wireless Power Transmitter

Referring to FIG. 2A, the wireless power transmitter 100 may include a power transmission unit 110. The power transmission unit 110 may include a power conversion unit 111 and a power transmission control unit 112.

The power conversion unit 111 transfers power supplied from a transmission side power supply unit 190 to the wireless power receiver 200 by converting it into a wireless power signal. The wireless power signal transferred by the power conversion unit 111 is generated in the form of a magnetic field or electro-magnetic field having an oscillation characteristic. For this purpose, the power conversion unit 111 may be configured to include a coil for generating the wireless power signal.

The power conversion unit 111 may include a constituent element for generating a different type of wireless power signal according to each power transfer method. For example, the power conversion unit 111 may include a primary coil for forming a changing magnetic field to induce a current to a secondary coil of the wireless power receiver 200. Furthermore, the power conversion unit 111 may include a coil (or antenna) for forming a magnetic field having a specific resonant frequency to generate a resonant frequency in the wireless power receiver 200 according to the resonance coupling method.

Furthermore, the power conversion unit 111 may transfer power using at least one of the foregoing inductive coupling method and the resonance coupling method.

Among the constituent elements included in the power conversion unit 111, those for the inductive coupling method will be described later with reference to FIGS. 4 and 5, and those for the resonance coupling method will be described with reference to FIGS. 7 and 8.

On the other hand, the power conversion unit 111 may further include a circuit for controlling the characteristics of a used frequency, an applied voltage, an applied current or the like to form the wireless power signal.

The power transmission control unit 112 controls each of the constituent elements included in the power transmission unit 110 The power transmission control unit 112 may be implemented to be integrated into another control unit (not shown) for controlling the wireless power transmitter 100.

On the other hand, a region to which the wireless power signal can be approached may be divided into two types. First, an active area denotes a region through which a wireless power signal transferring power to the wireless power receiver 200 is passed. Next, a semi-active area denotes an interest region in which the wireless power transmitter 100 can detect the existence of the wireless power receiver 200. Here, the power transmission control unit 112 may detect whether the wireless power receiver 200 is placed in the active area or detection area or removed from the area. Specifically, the power transmission control unit 112 may detect whether or not the wireless power receiver 200 is placed in the active area or detection area using a wireless power signal formed from the power conversion unit 111 or a sensor separately provided therein. For instance, the power transmission control unit 112 may detect the presence of the wireless power receiver 200 by monitoring whether or not the characteristic of power for forming the wireless power signal is changed by the wireless power signal, which is affected by the wireless power receiver 200 existing in the detection area. However, the active area and detection area may vary according to the wireless power transfer method such as an inductive coupling method, a resonance coupling method, and the like.

The power transmission control unit 112 may perform the process of identifying the wireless power receiver 200 or determine whether to start wireless power transfer according to a result of detecting the existence of the wireless power receiver 200.

Furthermore, the power transmission control unit 112 may determine at least one characteristic of a frequency, a voltage, and a current of the power conversion unit 111 for forming the wireless power signal. The determination of the characteristic may be carried out by a condition at the side of the wireless power transmitter 100 or a condition at the side of the wireless power receiver 200.

The power transmission control unit 112 may receive a power control message from the wireless power receiver 200. The power transmission control unit 112 may determine at least one characteristic of a frequency, a voltage and a current of the power conversion unit 111 based on the received power control message, and additionally perform other control operations based on the power control message.

For example, the power transmission control unit 112 may determine at least one characteristic of a frequency, a voltage and a current used to form the wireless power signal according to the power control message including at least one of rectified power amount information, charging state information and identification information in the wireless power receiver 200.

Furthermore, as another control operation using the power control message, the wireless power transmitter 100 may perform a typical control operation associated with wireless power transfer based on the power control message. For example, the wireless power transmitter 100 may receive information associated with the wireless power receiver 200 to be auditorily or visually outputted through the power control message, or receive information required for authentication between devices.

In exemplary embodiments, the power transmission control unit 112 may receive the power control message through the wireless power signal. In other exemplary embodiment, the power transmission control unit 112 may receive the power control message through a method for receiving user data.

In order to receive the foregoing power control message, the wireless power transmitter 100 may further include a modulation/demodulation unit 113 electrically connected to the power conversion unit 111. The modulation/demodulation unit 113 may modulate a wireless power signal that has been modulated by the wireless power receiver 200 and use it to receive the power control message.

In addition, the power transmission control unit 112 may acquire a power control message by receiving user data including a power control message by a communication means (not shown) included in the wireless power transmitter 100.

[For Supporting In-Band Two-Way Communication]

Under a wireless power transfer environment allowing for bi-directional communications according to the exemplary embodiments disclosed herein, the power transmission control unit 112 may transmit data to the wireless power receiver 200. The data transmitted by the power transmission control unit 112 may be transmitted to request the wireless power receiver 200 to send the power control message.

Wireless Power Receiver

Referring to FIG. 2B, the wireless power receiver 200 may include a power supply unit 290. The power supply unit 290 supplies power required for the operation of the wireless power receiver 200. The power supply unit 290 may include a power receiving unit 291 and a power reception control unit 292.

The power receiving unit 291 receives power transferred from the wireless power transmitter 100 in a wireless manner.

The power receiving unit 291 may include constituent elements required to receive the wireless power signal according to a wireless power transfer method. Furthermore, the power receiving unit 291 may receive power according to at least one wireless power transfer method, and in this case, the power receiving unit 291 may include constituent elements required for each method.

First, the power receiving unit 291 may include a coil for receiving a wireless power signal transferred in the form of a magnetic field or electromagnetic field having a vibration characteristic.

For instance, as a constituent element according to the inductive coupling method, the power receiving unit 291 may include a secondary coil to which a current is induced by a changing magnetic field. In exemplary embodiments, the power receiving unit 291, as a constituent element according to the resonance coupling method, may include a coil and a resonant circuit in which resonance phenomenon is generated by a magnetic field having a specific resonant frequency.

In another exemplary embodiments, when the power receiving unit 291 receives power according to at least one wireless power transfer method, the power receiving unit 291 may be implemented to receive power by using a coil, or implemented to receive power by using a coil formed differently according to each power transfer method.

Among the constituent elements included in the power receiving unit 291, those for the inductive coupling method will be described later with reference to FIG. 4, and those for the resonance coupling method with reference to FIG. 7.

On the other hand, the power receiving unit 291 may further include a rectifier and a regulator to convert the wireless power signal into a direct current. Furthermore, the power receiving unit 291 may further include a circuit for protecting an overvoltage or overcurrent from being generated by the received power signal.

The power reception control unit 292 may control each constituent element included in the power supply unit 290.

Specifically, the power reception control unit 292 may transfer a power control message to the wireless power transmitter 100. The power control message may instruct the wireless power transmitter 100 to initiate or terminate a transfer of the wireless power signal. Furthermore, the power control message may instruct the wireless power transmitter 100 to control a characteristic of the wireless power signal.

In exemplary embodiments, the power reception control unit 292 may transmit the power control message through at least one of the wireless power signal and user data.

In order to transmit the foregoing power control message, the wireless power receiver 200 may further include a modulation/demodulation unit 293 electrically connected to the power receiving unit 291. The modulation/demodulation unit 293, similarly to the case of the wireless power transmitter 100, may be used to transmit the power control message through the wireless power signal. The power communications modulation/demodulation unit 293 may be used as a means for controlling a current and/or voltage flowing through the power conversion unit 111 of the wireless power transmitter 100. Hereinafter, a method for allowing the power communications modulation/demodulation unit 113 or 293 at the side of the wireless power transmitter 100 and at the side of the wireless power receiver 200, respectively, to be used to transmit and receive a power control message through a wireless power signal will be described.

A wireless power signal formed by the power conversion unit 111 is received by the power receiving unit 291. At this time, the power reception control unit 292 controls the power communications modulation/demodulation unit 293 at the side of the wireless power receiver 200 to modulate the wireless power signal. For instance, the power reception control unit 292 may perform a modulation process such that a power amount received from the wireless power signal is varied by changing a reactance of the power communications modulation/demodulation unit 293 connected to the power receiving unit 291. The change of a power amount received from the wireless power signal results in the change of a current and/or voltage of the power conversion unit 111 for forming the wireless power signal. At this time, the modulation/demodulation unit 113 at the side of the wireless power transmitter 100 may detect a change of the current and/or voltage to perform a demodulation process.

In other words, the power reception control unit 292 may generate a packet including a power control message intended to be transferred to the wireless power transmitter 100 and modulate the wireless power signal to allow the packet to be included therein, and the power transmission control unit 112 may decode the packet based on a result of performing the demodulation process of the power communications modulation/demodulation unit 113 to acquire the power control message included in the packet.

In addition, the power reception control unit 292 may transmit a power control message to the wireless power transmitter 100 by transmitting user data including the power control message by a communication means (not shown) included in the wireless power receiver 200.

[For Supporting In-Band Two-Way Communication]

Under a wireless power transfer environment allowing for bi-directional communications according to the exemplary embodiments disclosed herein, the power reception control unit 292 may receive data to the wireless power transmitter 100. The data transmitted by the wireless power transmitter 100 may be transmitted to request the wireless power receiver 200 to send the power control message.

In addition, the power supply unit 290 may further include a charger 298 and a battery 299.

The wireless power receiver 200 receiving power for operation from the power supply unit 290 may be operated by power transferred from the wireless power transmitter 100, or operated by charging the battery 299 using the transferred power and then receiving the charged power. At this time, the power reception control unit 292 may control the charger 298 to perform charging using the transferred power.

Hereinafter, description will be given of a wireless power transmitter and a wireless power receiver applicable to the exemplary embodiments disclosed herein. First, a method of allowing the wireless power transmitter to transfer power to the electronic device according to the inductive coupling method will be described with reference to FIGS. 3 through 5.

Inductive Coupling Method

FIG. 3 is a view illustrating a concept in which power is transferred from a wireless power transmitter to an electronic device in a wireless manner according to an inductive coupling method.

When the power of the wireless power transmitter 100 is transferred in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the wireless power receiver 200.

According to the foregoing method, the power conversion unit 111 of the wireless power transmitter 100 may include a transmitting (Tx) coil 1111a being operated as a primary coil in magnetic induction. Furthermore, the power receiving unit 291 of the wireless power receiver 200 may include a receiving (Rx) coil 2911a being operated as a secondary coil in magnetic induction.

First, the wireless power transmitter 100 and wireless power receiver 200 are disposed in such a manner that the transmitting coil 1111a at the side of the wireless power transmitter 100 and the receiving coil at the side of the wireless power receiver 200 are located adjacent to each other. Then, if the power transmission control unit 112 controls a current of the transmitting coil (Tx coil) 1111a to be changed, then the power receiving unit 291 controls power to be supplied to the wireless power receiver 200 using an electromotive force induced to the receiving coil (Rx coil) 2911a.

The efficiency of wireless power transfer by the inductive coupling method may be little affected by a frequency characteristic, but affected by an alignment and distance between the wireless power transmitter 100 and the wireless power receiver 200 including each coil.

On the other hand, in order to perform wireless power transfer in the inductive coupling method, the wireless power transmitter 100 may be configured to include an interface surface (not shown) in the form of a flat surface. One or more electronic devices may be placed at an upper portion of the interface surface, and the transmitting coil 1111a may be mounted at a lower portion of the interface surface. In this case, a vertical spacing is formed in a small-scale between the transmitting coil 1111a mounted at a lower portion of the interface surface and the receiving coil 2911a of the wireless power receiver 200 placed at an upper portion of the interface surface, and thus a distance between the coils becomes sufficiently small to efficiently implement contactless power transfer by the inductive coupling method.

Furthermore, an alignment indicator (not shown) indicating a location where the wireless power receiver 200 is to be placed at an upper portion of the interface surface. The alignment indicator indicates a location of the wireless power receiver 200 where an alignment between the transmitting coil 1111a mounted at a lower portion of the interface surface and the receiving coil 2911a can be suitably implemented. The alignment indicator may alternatively be simple marks, or may be formed in the form of a protrusion structure for guiding the location of the wireless power receiver 200. Otherwise, the alignment indicator may be formed in the form of a magnetic body such as a magnet mounted at a lower portion of the interface surface, thereby guiding the coils to be suitably arranged by mutual magnetism to a magnetic body having an opposite polarity mounted within the wireless power receiver 200.

On the other hand, the wireless power transmitter 100 may be formed to include one or more transmitting coils. The wireless power transmitter 100 may selectively use some of coils suitably arranged with the receiving coil 2911a of the wireless power receiver 200 among the one or more transmitting coils to enhance the power transmission efficiency. The wireless power transmitter 100 including the one or more transmitting coils will be described later with reference to FIG. 5.

Hereinafter, configurations of the wireless power transmitter and electronic device using an inductive coupling method applicable to the embodiments disclosed herein will be described in detail.

Wireless power transmitter and electronic device in inductive coupling method

FIG. 4 is a block diagram illustrating part of the wireless power transmitter 100 and wireless power receiver 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the wireless power receiver 200 will be described with reference to FIG. 4B.

Referring to FIG. 4A, the power conversion unit 111 of the wireless power transmitter 100 may include a transmitting (Tx) coil 1111a and an inverter 1112.

The transmitting coil 1111a may form a magnetic field corresponding to the wireless power signal according to a change of current as described above. The transmitting coil 1111a may alternatively be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmitting coil 1111a and a capacitor (not shown) to form a magnetic field in the transmitting coil 1111a.

In addition, the power conversion unit 111 may further include a positioning unit 1114.

The positioning unit 1114 may move or rotate the transmitting coil 1111a to enhance the effectiveness of contactless power transfer using the inductive coupling method. As described above, it is because an alignment and distance between the wireless power transmitter 100 and the wireless power receiver 200 including a primary coil and a secondary coil may affect power transfer using the inductive coupling method. In particular, the positioning unit 1114 may be used when the wireless power receiver 200 does not exist within an active area of the wireless power transmitter 100.

Accordingly, the positioning unit 1114 may include a drive unit (not shown) for moving the transmitting coil 1111a such that a center-to-center distance of the transmitting coil 1111a of the wireless power transmitter 100 and the receiving coil 2911a of the wireless power receiver 200 is within a predetermined range, or rotating the transmitting coil 1111a such that the centers of the transmitting coil 1111a and the receiving coil 2911a are overlapped with each other.

For this purpose, the wireless power transmitter 100 may further include a detection unit (not shown) made of a sensor for detecting the location of the wireless power receiver 200, and the power transmission control unit 112 may control the positioning unit 1114 based on the location information of the wireless power receiver 200 received from the location detection sensor.

Furthermore, to this end, the power transmission control unit 112 may receive control information on an alignment or distance to the wireless power receiver 200 through the power communications modulation/demodulation unit 113, and control the positioning unit 1114 based on the received control information on the alignment or distance.

If the power conversion unit 111 is configured to include a plurality of transmitting coils, then the positioning unit 1114 may determine which one of the plurality of transmitting coils is to be used for power transmission. The configuration of the wireless power transmitter 100 including the plurality of transmitting coils will be described later with reference to FIG. 5.

On the other hand, the power conversion unit 111 may further include a power sensing unit 1115. The power sensing unit 1115 at the side of the wireless power transmitter 100 monitors a current or voltage flowing into the transmitting coil 1111a. The power sensing unit 1115 is provided to check whether or not the wireless power transmitter 100 is normally operated, and thus the power sensing unit 1115 may detect a voltage or current of the power supplied from the outside, and check whether the detected voltage or current exceeds a threshold value. The power sensing unit 1115, although not shown, may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 may control a switching unit (not shown) to cut off power applied to the transmitting coil 1111a.

Referring to FIG. 4B, the power supply unit 290 of the wireless power receiver 200 may include a receiving (Rx) coil 2911a and a rectifier 2913.

A current is induced into the receiving coil 2911a by a change of the magnetic field formed in the transmitting coil 1111a. The implementation type of the receiving coil 2911a may be a planar spiral type or cylindrical solenoid type similarly to the transmitting coil 1111a.

Furthermore, series and parallel capacitors may be configured to be connected to the receiving coil 2911a to enhance the effectiveness of wireless power reception or perform resonant detection.

The receiving coil 2911a may be in the form of a single coil or a plurality of coils.

The rectifier 2913 performs a full-wave rectification to a current to convert alternating current into direct current. The rectifier 2913, for instance, may be implemented with a full-bridge rectifier made of four diodes or a circuit using active components.

In addition, the rectifier 2913 may further include a regulator for converting a rectified current into a more flat and stable direct current. Furthermore, the output power of the rectifier 2913 is supplied to each constituent element of the power supply unit 290. Furthermore, the rectifier 2913 may further include a DC-DC converter for converting output DC power into a suitable voltage to adjust it to the power required for each constituent element (for instance, a circuit such as a charger 298).

The power communications modulation/demodulation unit 293 may be connected to the power receiving unit 291, and may be configured with a resistive element in which resistance varies with respect to direct current, and may be configured with a capacitive element in which reactance varies with respect to alternating current. The power reception control unit 292 may change the resistance or reactance of the power communications modulation/demodulation unit 293 to modulate a wireless power signal received to the power receiving unit 291.

On the other hand, the power supply unit 290 may further include a power sensing unit 2914. The power sensing unit 2914 at the side of the wireless power receiver 200 monitors a voltage and/or current of the power rectified by the rectifier 2913, and if the voltage and/or current of the rectified power exceeds a threshold value as a result of monitoring, then the power reception control unit 292 transmits a power control message to the wireless power transmitter 100 to transfer suitable power.

Wireless power transmitter configured to include one or more transmitting coils

FIG. 5 is a block diagram illustrating a wireless power transmitter configured to have one or more transmission coils receiving power according to an inductive coupling method that can be employed in the embodiments disclosed herein.

Referring to FIG. 5, the power conversion unit 111 of the wireless power transmitter 100 according to the embodiments disclosed herein may include one or more transmitting coils 1111a-1 to 1111a-n. The one or more transmitting coils 1111a-1 to 1111a-n may be an array of partly overlapping primary coils. An active area may be determined by some of the one or more transmitting coils.

The one or more transmitting coils 1111a-1 to 1111a-n may be mounted at a lower portion of the interface surface. Furthermore, the power conversion unit 111 may further include a multiplexer 1113 for establishing and releasing the connection of some of the one or more transmitting coils 1111a-1 to 1111a-n.

Upon detecting the location of the wireless power receiver 200 placed at an upper portion of the interface surface, the power transmission control unit 112 may take the detected location of the wireless power receiver 200 into consideration to control the multiplexer 1113, thereby allowing coils that can be placed in an inductive coupling relation to the receiving coil 2911a of the wireless power receiver 200 among the one or more transmitting coils 1111a-1 to 1111a-n to be connected to one another.

For this purpose, the power transmission control unit 112 may acquire the location information of the wireless power receiver 200. For example, the power transmission control unit 112 may acquire the location of the wireless power receiver 200 on the interface surface by the location detection unit (not shown) provided in the wireless power transmitter 100. For another example, the power transmission control unit 112 may alternatively receive a power control message indicating a strength of the wireless power signal from an object on the interface surface or a power control message indicating the identification information of the object using the one or more transmitting coils 1111a-1 to 1111a-n, respectively, and determines whether it is located adjacent to which one of the one or more transmitting coils based on the received result, thereby acquiring the location information of the wireless power receiver 200.

On the other hand, the active area as part of the interface surface may denote a portion through which a magnetic field with a high efficiency can pass when the wireless power transmitter 100 transfers power to the wireless power receiver 200 in a wireless manner. At this time, a single transmitting coil or one or a combination of more transmitting coils forming a magnetic field passing through the active area may be designated as a primary cell. Accordingly, the power transmission control unit 112 may determine an active area based on the detected location of the wireless power receiver 200, and establish the connection of a primary cell corresponding to the active area to control the multiplexer 1113, thereby allowing the receiving coil 2911a of the wireless power receiver 200 and the coils belonging to the primary cell to be placed in an inductive coupling relation.

Furthermore, the power conversion unit 111 may further include an impedance matching unit (not shown) for controlling an impedance to form a resonant circuit with the coils connected thereto.

Hereinafter, a method for allowing a wireless power transmitter to transfer power according to a resonance coupling method will be disclosed with reference to FIGS. 6 through 8.

Resonance Coupling Method

FIG. 6 is a view illustrating a concept in which power is transferred to an electronic device from a wireless power transmitter in a wireless manner according to a resonance coupling method.

First, resonance will be described in brief as follows. Resonance refers to a phenomenon in which amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, and in this case, resulting in a reduced resistance between the plurality of vibrating bodies. In an electrical circuit, a resonant circuit can be made by using an inductor and a capacitor.

When the wireless power transmitter 100 transfers power according to the inductive coupling method, a magnetic field having a specific vibration frequency is formed by alternating current power in the power transmission unit 110. If a resonance phenomenon occurs in the wireless power receiver 200 by the formed magnetic field, then power is generated by the resonance phenomenon in the wireless power receiver 200.

The resonant frequency may be determined by the following formula in Equation 1.

$$f = \frac{1}{2\pi\sqrt{LC}} \qquad \text{[Equation 1]}$$

Here, the resonant frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit may be configured to be connected thereto to determine the resonant frequency.

Referring to FIG. 6, when power is transmitted in a wireless manner according to the resonance coupling method, the power conversion unit 111 of the wireless power transmitter 100 may include a transmitting (Tx) coil 1111b in which a magnetic field is formed and a resonant circuit 1116 connected to the transmitting coil 1111b to determine a specific vibration frequency. The resonant circuit 1116 may be implemented by using a capacitive circuit (capacitors), and the specific vibration frequency may be determined based on an inductance of the transmitting coil 1111b and a capacitance of the resonant circuit 1116.

The configuration of a circuit element of the resonant circuit 1116 may be implemented in various forms such that the power conversion unit 111 forms a magnetic field, and is not limited to a form of being connected in parallel to the transmitting coil 1111b as illustrated in FIG. 6.

Furthermore, the power receiving unit 291 of the wireless power receiver 200 may include a resonant circuit 2912 and a receiving (Rx) coil 2911b to generate a resonance phenomenon by a magnetic field formed in the wireless power transmitter 100. In other words, the resonant circuit 2912 may be also implemented by using a capacitive circuit, and the resonant circuit 2912 is configured such that a resonant frequency determined based on an inductance of the receiving coil 2911b and a capacitance of the resonant circuit 2912 has the same frequency as a resonant frequency of the formed magnetic field.

The configuration of a circuit element of the resonant circuit 2912 may be implemented in various forms such that the power receiving unit 291 generates resonance by a magnetic field, and is not limited to a form of being connected in series to the receiving coil 2911b as illustrated in FIG. 6.

The specific vibration frequency in the wireless power transmitter 100 may have $L_{TX}$, $C_{TX}$, and may be acquired by using the Equation 1. Here, the wireless power receiver 200 generates resonance when a result of substituting the $L_{RX}$ and $C_{RX}$ of the wireless power receiver 200 to the Equation 1 is same as the specific vibration frequency.

According to a contactless power transfer method by resonance coupling, when the wireless power transmitter 100 and wireless power receiver 200 resonate at the same frequency, respectively, an electromagnetic wave is propagated through a short-range magnetic field, and thus there exists no energy transfer between the devices if they have different frequencies.

As a result, an efficiency of contactless power transfer by the resonance coupling method is greatly affected by a frequency characteristic, whereas the effect of an alignment and distance between the wireless power transmitter 100 and the wireless power receiver 200 including each coil is relatively smaller than the inductive coupling method.

Hereinafter, the configuration of a wireless power transmitter and an electronic device in the resonance coupling method applicable to the embodiments disclosed herein will be described in detail.

Wireless Power Transmitter in Resonance Coupling Method

FIG. 7 is a block diagram illustrating part of the wireless power transmitter 100 and wireless power receiver 200 in a resonance method that can be employed in the embodiments disclosed herein.

A configuration of the power transmission unit 110 included in the wireless power transmitter 100 will be described with reference to FIG. 7A.

The power conversion unit 111 of the wireless power transmitter 100 may include a transmitting (Tx) coil 1111b, an inverter 1112, and a resonant circuit 1116. The inverter 1112 may be configured to be connected to the transmitting coil 1111b and the resonant circuit 1116.

The transmitting coil 1111b may be mounted separately from the transmitting coil 1111a for transferring power according to the inductive coupling method, but may transfer power in the inductive coupling method and resonance coupling method using one single coil.

The transmitting coil 1111b, as described above, forms a magnetic field for transferring power. The transmitting coil 1111b and the resonant circuit 1116 generate resonance when alternating current power is applied thereto, and at this time, a vibration frequency may be determined based on an inductance of the transmitting coil 1111b and a capacitance of the resonant circuit 1116.

For this purpose, the inverter 1112 transforms a DC input obtained from the power supply unit 190 into an AC waveform, and the transformed AC current is applied to the transmitting coil 1111b and the resonant circuit 1116.

In addition, the power conversion unit 111 may further include a frequency adjustment unit 1117 for changing a resonant frequency of the power conversion unit 111. The resonant frequency of the power conversion unit 111 is determined based on an inductance and/or capacitance within a circuit constituting the power conversion unit 111 by Equation 1, and thus the power transmission control unit 112 may determine the resonant frequency of the power conversion unit 111 by controlling the frequency adjustment unit 1117 to change the inductance and/or capacitance.

The frequency adjustment unit 1117, for example, may be configured to include a motor for adjusting a distance between capacitors included in the resonant circuit 1116 to change a capacitance, or include a motor for adjusting a number of turns or diameter of the transmitting coil 1111b to change an inductance, or include active elements for determining the capacitance and/or inductance On the other hand, the power conversion unit 111 may further include a power sensing unit 1115. The operation of the power sensing unit 1115 is the same as the foregoing description.

Referring to FIG. 7B, a configuration of the power supply unit 290 included in the wireless power receiver 200 will be described. The power supply unit 290, as described above, may include the receiving (Rx) coil 2911b and resonant circuit 2912.

In addition, the power receiving unit 291 of the power supply unit 290 may further include a rectifier 2913 for converting an AC current generated by resonance phenomenon into DC. The rectifier 2913 may be configured similarly to the foregoing description.

Furthermore, the power receiving unit 291 may further include a power sensing unit 2914 for monitoring a voltage and/or current of the rectified power. The power sensing unit 2914 may be configured similarly to the foregoing description.

Wireless Power Transmitter Configured to Include One or More Transmitting Coils

FIG. 8 is a block diagram illustrating a wireless power transmitter configured to have one or more transmission coils receiving power according to a resonance coupling method that can be employed in the embodiments disclosed herein.

Referring to FIG. 8, the power conversion unit 111 of the wireless power transmitter 100 according to the embodiments disclosed herein may include one or more transmitting coils 1111b-1 to 1111b-n and resonant circuits (1116-1 to 1116-n) connected to each transmitting coils. Furthermore, the power conversion unit 111 may further include a multiplexer 1113 for establishing and releasing the connection of some of the one or more transmitting coils 1111b-1 to 1111b-n.

The one or more transmitting coils 1111b-1 to 1111b-n may be configured to have the same vibration frequency, or some of them may be configured to have different vibration frequencies. It is determined by an inductance and/or capacitance of the resonant circuits (1116-1 to 1116-n) connected to the one or more transmitting coils 1111b-1 to 1111b-n, respectively.

For this purpose, the frequency adjustment unit 1117 may be configured to change an inductance and/or capacitance of the resonant circuits (1116-1 to 1116-n) connected to the one or more transmitting coils 1111b-1 to 1111b-n, respectively.

In-Band Communication

FIG. 9 a view illustrating the concept of transmitting and receiving a packet between a wireless power transmitter and a wireless power receiver through the modulation and demodulation of a wireless power signal in transferring power in a wireless manner disclosed herein.

As illustrated in FIG. 9, the power conversion unit 111 included in the wireless power transmitter 100 may generate a wireless power signal. The wireless power signal may be generated through the transmitting coil 1111 included in the power conversion unit 111.

The wireless power signal 10a generated by the power conversion unit 111 may arrive at the wireless power receiver 200 so as to be received through the power receiving unit 291 of the wireless power receiver 200. The generated wireless power signal may be received through the receiving coil 2911 included in the power receiving unit 291.

The power reception control unit 292 may control the modulation/demodulation unit 293 connected to the power receiving unit 291 to modulate the wireless power signal while the wireless power receiver 200 receives the wireless power signal. When the received wireless power signal is modulated, the wireless power signal may form a closed-loop within a magnetic field or an electro-magnetic field. This may allow the wireless power transmitter 100 to sense a modulated wireless power signal 10b. The modulation/demodulation unit 113 may demodulate the sensed wireless power signal and decode the packet from the demodulated wireless power signal.

The modulation method employed for the communication between the wireless power transmitter 100 and the wireless power receiver 200 may be an amplitude modulation. As aforementioned, the amplitude modulation is a backscatter modulation may be a backscatter modulation method in which the power communications modulation/demodulation unit 293 at the side of the wireless power receiver 200 changes an amplitude of the wireless power signal 10a formed by the power conversion unit 111 and the power reception control unit 292 at the side of the wireless power transmitter 100 detects an amplitude of the modulated wireless power signal 10b.

Modulation and Demodulation of Wireless Power Signal

Hereinafter, description will be given of modulation and demodulation of a packet, which is transmitted or received between the wireless power transmitter 100 and the wireless power receiver 200 with reference to FIGS. 10 and 11.

FIG. 10 is a view illustrating a configuration of transmitting or receiving a power control message in transferring power in a wireless manner disclosed herein, and FIG. 11 is a view illustrating forms of signals upon modulation and demodulation executed in the wireless power transfer disclosed herein.

Referring to FIG. 10, the wireless power signal received through the power receiving unit 291 of the wireless power receiver 200, as illustrated in FIG. 11A, may be a non-modulated wireless power signal 51. The wireless power receiver 200 and the wireless power transmitter 100 may establish a resonance coupling according to a resonant frequency, which is set by the resonant circuit 2912 within the power receiving unit 291, and the wireless power signal 51 may be received through the receiving coil 2911b.

The power reception control unit 292 may modulate the wireless power signal 51 received through the power receiving unit 291 by changing a load impedance within the modulation/demodulation unit 293. The modulation/demodulation unit 293 may include a passive element 2931 and an active element 2932 for modulating the wireless power signal 51. The modulation/demodulation unit 293 may modulate the wireless power signal 51 to include a packet, which is desired to be transmitted to the wireless power transmitter 100. Here, the packet may be input into the active element 2932 within the modulation/demodulation unit 293.

Afterwards, the power transmission control unit 112 of the wireless power transmitter 100 may demodulate a modulated wireless power signal 52 through an envelop detection, and decode the detected signal 53 into digital data 54. The demodulation may detect a current or voltage flowing into the power conversion unit 111 to be classified into two states, a HI phase and a LO phase, and acquire a packet to be transmitted by the wireless power receiver 200 based on digital data classified according to the states.

Hereinafter, a process of allowing the wireless power transmitter 100 to acquire a power control message to be transmitted by the wireless power receiver 200 from the demodulated digital data will be described.

Referring to FIG. 11B, the power transmission control unit 112 detects an encoded bit using a clock signal (CLK) from an envelope detected signal. The detected encoded bit is encoded according to a bit encoding method used in the modulation process at the side of the wireless power receiver 200. The bit encoding method may correspond to any one of non-return to zero (NRZ) and bi-phase encoding.

For instance, the detected bit may be a differential bi-phase (DBP) encoded bit. According to the DBP encoding, the power reception control unit 292 at the side of the wireless power receiver 200 is allowed to have two state transitions to encode data bit 1, and to have one state transition to encode data bit 0. In other words, data bit 1 may be encoded in such a manner that a transition between the HI state and LO state is generated at a rising edge and falling edge of the clock signal, and data bit 0 may be encoded in such a manner that a transition between the HI state and LO state is generated at a rising edge of the clock signal.

On the other hand, the power transmission control unit 112 may acquire data in a byte unit using a byte format constituting a packet from a bit string detected according to the bit encoding method. For instance, the detected bit string may be transferred by using an 11-bit asynchronous serial format as illustrated in FIG. 12C. In other words, the detected bit may include a start bit indicating the beginning of a byte and a stop bit indicating the end of a byte, and also include data bits (b0 to b7) between the start bit and the stop bit. Furthermore, it may further include a parity bit for checking an error of data. The data in a byte unit constitutes a packet including a power control message.

[For Supporting In-Band Two-Way Communication]

As aforementioned, FIG. 9 has illustrated that the wireless power receiver 200 transmits a packet using a carrier signal 10a formed by the wireless power transmitter 100. However, the wireless power transmitter 100 may also transmit data to the wireless power receiver 200 by a similar method.

That is, the power transmission control unit 112 may control the modulation/demodulation unit 113 to modulate data, which is to be transmitted to the wireless power receiver 200, such that the data can be included in the carrier signal 10a. Here, the power reception control unit 292 of the wireless power receiver 200 may control the modulation/demodulation unit 293 to execute demodulation so as to acquire data from the modulated carrier signal 10a.

Packet Format

Hereinafter, description will be given of a structure of a packet used in communication using a wireless power signal according to the exemplary embodiments disclosed herein.

FIG. 12 is a view illustrating a packet including a power control message used in a contactless (wireless) power transfer method according to the embodiments disclosed herein.

As illustrated in FIG. 12A, the wireless power transmitter 100 and the wireless power receiver 200 may transmit and receive data desired to transmit in a form of a command packet (command_packet) 510. The command packet 510 may include a header 511 and a message 512.

The header 511 may include a field indicating a type of data included in the message 512. Size and type of the message may be decided based on a value of the field which indicates the type of data.

The header 511 may include an address field for identifying a transmitter (originator) of the packet. For example, the address field may indicate an identifier of the wireless power receiver 200 or an identifier of a group to which the wireless power receiver 200 belongs. When the wireless power receiver 200 transmits the packet 510, the wireless power receiver 200 may generate the packet 510 such that the address field can indicate identification information related to the receiver 200 itself.

The message 512 may include data that the originator of the packet 510 desires to transmit. The data included in the message 512 may be a report, a request or a response for the other party.

According to one exemplary embodiment, the command packet 510 may be configured as illustrated in FIG. 12B. The header 511 included in the command packet 510 may be represented with a predetermined size. For example, the header 511 may have a 2-byte size.

The header 511 may include a reception address field. For example, the reception address field may have a 6-bit size.

The header 511 may include an operation command field (OCF) or an operation group field (OGF). The OGF is a value given for each group of commands for the wireless power receiver 200, and the OCF is a value given for each command existing in each group in which the wireless power receiver 200 is included.

The message 512 may be divided into a length field 5121 of a parameter and a value field 5122 of the parameter. That is, the originator of the packet 510 may generate the message by a length-value pair (5121a-5122a, etc.) of at least one parameter, which is required to represent data desired to transmit.

Referring to FIG. 12C, the wireless power transmitter 100 and the wireless power receiver 200 may transmit and receive the data in a form of a packet which further has a preamble 520 and a checksum 530 added to the command packet 510.

The preamble 520 may be used to perform synchronization with data received by the wireless power transmitter 100 and detect the start bit of the header 520. The preamble 520 may be configured to repeat the same bit. For instance, the preamble 520 may be configured such that data bit 1 according to the DBP encoding is repeated eleven to twenty five times.

The checksum 530 may be used to detect an error that can be occurred in the command packet 510 while transmitting a power control message.

Operation Phases

Hereinafter, description will be given of operation phases of the wireless power transmitter 100 and the wireless power receiver 200.

FIG. 13 illustrates the operation phases of the wireless power transmitter 100 and the wireless power receiver 200 according to the embodiments disclosed herein. Furthermore, FIGS. 14 to 18 illustrate the structures of packets including a power control message between the wireless power transmitter 100 and the wireless power receiver 200.

Referring to FIG. 13, the operation phases of the wireless power transmitter 100 and the wireless power receiver 200 for wireless power transfer may be divided into a selection phase 610, a ping phase 620, an identification and configuration phase 630, and a power transfer phase 640.

The wireless power transmitter 100 detects whether or not objects exist within a range that the wireless power transmitter 100 can transmit power in a wireless manner in the selection phase 610, and the wireless power transmitter 100 sends a detection signal to the detected object and the wireless power receiver 200 sends a response to the detection signal in the ping phase 620.

Furthermore, the wireless power transmitter 100 identifies the wireless power receiver 200 selected through the previous states and acquires configuration information for power transmission in the identification and configuration phase 630. The wireless power transmitter 100 transmits power to the wireless power receiver 200 while controlling power transmitted in response to a control message received from the wireless power receiver 200 in the power transfer phase 640.

Hereinafter, each of the operation phases will be described in detail.

1) Selection Phase

The wireless power transmitter 100 in the selection phase 610 performs a detection process to select the wireless power receiver 200 existing within a detection area. The detection area, as described above, refers to a region in which an object within the relevant area can affect on the characteristic of the power of the power conversion unit 111. Compared to the ping phase 620, the detection process for selecting the wireless power receiver 200 in the selection phase 610 is a process of detecting a change of the power amount for forming a wireless power signal in the power conversion unit at the side of the wireless power transmitter 100 to check whether any object exists within a predetermined range, instead of the scheme of receiving a response from the wireless power receiver 200 using a power control message. The detection process in the selection phase 610 may be referred to as an analog ping process in the aspect of detecting an object using a wireless power signal without using a packet in a digital format in the ping phase 620 which will be described later.

The wireless power transmitter 100 in the selection phase 610 can detect that an object comes in or out within the detection area. Furthermore, the wireless power transmitter 100 can distinguish the wireless power receiver 200 capable of transferring power in a wireless manner from other objects (for example, a key, a coin, etc.) among objects located within the detection area.

As described above, a distance that can transmit power in a wireless manner may be different according to the inductive coupling method and resonance coupling method, and thus the detection area for detecting an object in the selection phase 610 may be different from one another.

First, in case where power is transmitted according to the inductive coupling method, the wireless power transmitter 100 in the selection phase 610 can monitor an interface surface (not shown) to detect the alignment and removal of objects.

Furthermore, the wireless power transmitter 100 may detect the location of the wireless power receiver 200 placed on an upper portion of the interface surface. As described above, the wireless power transmitter 100 formed to include one or more transmitting coils may perform the process of entering the ping phase 620 in the selection phase 610, and checking whether or not a response to the detection signal is transmitted from the object using each coil in the ping phase 620 or subsequently entering the identification state 630 to check whether identification information is transmitted from the object. The wireless power transmitter 100 may determine a coil to be used for contactless power transfer based on the detected location of the wireless power receiver 200 acquired through the foregoing process.

Furthermore, when power is transmitted according to the resonance coupling method, the wireless power transmitter 100 in the selection phase 610 can detect an object by detecting that any one of a frequency, a current and a voltage of the power conversion unit is changed due to an object located within the detection area.

On the other hand, the wireless power transmitter 100 in the selection phase 610 may detect an object by at least any one of the detection methods using the inductive coupling method and resonance coupling method. The wireless power transmitter 100 may perform an object detection process according to each power transmission method, and subsequently select a method of detecting the object from the coupling methods for contactless power transfer to advance to other states 620, 630, 640.

On the other hand, for the wireless power transmitter 100, a wireless power signal formed to detect an object in the selection phase 610 and a wireless power signal formed to perform digital detection, identification, configuration and power transmission in the subsequent states 620, 630, 640 may have a different characteristic in the frequency, strength, and the like. It is because the selection phase 610 of the wireless power transmitter 100 corresponds to an idle state for detecting an object, thereby allowing the wireless power transmitter 100 to reduce consumption power in the idle state or generate a specialized signal for effectively detecting an object.

2) Ping Phase

The wireless power transmitter 100 in the ping phase 620 performs a process of detecting the wireless power receiver 200 existing within the detection area through a power control message. Compared to the detection process of the wireless power receiver 200 using a characteristic of the wireless power signal and the like in the selection phase 610, the detection process in the ping phase 620 may be referred to as a digital ping process.

The wireless power transmitter 100 in the ping phase 620 forms a wireless power signal to detect the wireless power receiver 200, modulates the wireless power signal modulated by the wireless power receiver 200, and acquires a power control message in a digital data format corresponding to a response to the detection signal from the modulated wireless power signal. The wireless power transmitter 100 may receive a power control message corresponding to the response to the detection signal to recognize the wireless power receiver 200 which is a subject of power transmission.

The detection signal formed to allowing the wireless power transmitter 100 in the ping phase 620 to perform a digital detection process may be a wireless power signal formed by applying a power signal at a specific operating point for a predetermined period of time. The operating point may denote a frequency, duty cycle, and amplitude of the voltage applied to the transmitting (Tx) coil. The wireless power transmitter 100 may generate the detection signal generated by applying the power signal at a specific operating point for a predetermined period of time, and attempt to receive a power control message from the wireless power receiver 200.

On the other hand, the power control message corresponding to a response to the detection signal may be a message indicating strength of the wireless power signal received by the wireless power receiver 200. For example, the wireless power receiver 200 may transmit a signal strength packet 5100 including a message indicating the received strength of the wireless power signal as a response to the detection signal as illustrated in FIG. 15. The packet 5100 may include a header 5120 for notifying a packet indicating the signal strength and a message 5130 indicating strength of the power signal received by the wireless power receiver 200. The strength of the power signal within the message 5130 may be a value indicating a degree of inductive coupling or resonance coupling for power transmission between the wireless power transmitter 100 and the wireless power receiver 200.

The wireless power transmitter 100 may receive a response message to the detection signal to find the wireless power receiver 200, and then extend the digital detection process to enter the identification and configuration phase 630. In other words, the wireless power transmitter 100 maintains the power signal at a specific operating point subsequent to finding the wireless power receiver 200 to receive a power control message required in the identification and configuration phase 630.

However, if the wireless power transmitter 100 is not able to find the wireless power receiver 200 to which power can be transferred, then the operation phase of the wireless power transmitter 100 will be returned to the selection phase 610.

3) Identification and Configuration Phase

The wireless power transmitter 100 in the identification and configuration phase 630 may receive identification information and/or configuration information transmitted by the wireless power receiver 200, thereby controlling power transmission to be effectively carried out.

The wireless power receiver 200 in the identification and configuration phase 630 may transmit a power control message including its own identification information. For this purpose, the wireless power receiver 200, for instance, may transmit an identification packet 5200 including a message indicating the identification information of the wireless power receiver 200 as illustrated in FIG. 16A. The packet 5200 may include a header 5220 for notifying a packet indicating identification information and a message 5230 including the identification information of the electronic device. The message 5230 may include information (2531 and 5232) indicating a version of the contract for contactless power transfer, information 5233 for identifying a manufacturer of the wireless power receiver 200, information 5234 indicating the presence or absence of an extended device identifier, and a basic device identifier 5235. Furthermore, if it is displayed that an extended device identifier exists in the information 5234 indicating the presence or absence of an extended device identifier, then an extended identification packet 5300 including the extended device identifier as illustrated in FIG. 16B will be transmitted in a separate manner. The packet 5300 may include a header 5320 for notifying a packet indicating an extended device identifier and a message 5330 including the extended device identifier. When the extended device identifier is used as described above, information based on the manufacturer's identification information 5233, the basic device identifier 5235 and the extended device identifier 5330 will be used to identify the wireless power receiver 200.

The wireless power receiver 200 may transmit a power control message including information on expected maximum power in the identification and configuration phase 630. To this end, the wireless power receiver 200, for instance, may transmit a configuration packet 5400 as illustrated in FIG. 17. The packet may include a header 5420 for notifying that it is a configuration packet and a message 5430 including information on the expected maximum power. The message 5430 may include power class 5431, information 5432 on expected maximum power, an indicator 5433 indicating a method of determining a current of a main cell at the side of the wireless power transmitter, and the number 5434 of optional configuration packets. The indicator 5433 may indicate whether or not a current of the main cell at the side of the wireless power transmitter is determined as specified in the contract for wireless power transfer.

On the other hand, the wireless power transmitter 100 may generate a power transfer contract which is used for power charging with the wireless power receiver 200 based on the identification information and/or configuration information. The power transfer contract may include the limits of parameters determining a power transfer characteristic in the power transfer phase 640.

The wireless power transmitter 100 may terminate the identification and configuration phase 630 and return to the selection phase 610 prior to entering the power transfer phase 640. For instance, the wireless power transmitter 100 may terminate the identification and configuration phase 630 to find another electronic device that can receive power in a wireless manner.

4) Power Transfer Phase

The wireless power transmitter 100 in the power transfer phase 640 transmits power to the wireless power receiver 200.

The wireless power transmitter 100 may receive a power control message from the wireless power receiver 200 while transferring power, and control a characteristic of the power applied to the transmitting coil in response to the received power control message. For example, the power control message used to control a characteristic of the power applied to the transmitting coil may be included in a control error packet 5500 as illustrated in FIG. 18. The packet 5500 may include a header 5520 for notifying that it is a control error packet and a message 5530 including a control error value. The wireless power transmitter 100 may control the power applied to the transmitting coil according to the control error value. In other words, a current applied to the transmitting coil may be controlled so as to be maintained if the control error value is "0," reduced if the control error value is a negative value, and increased if the control error value is a positive value.

The wireless power transmitter 100 may monitor parameters within a power transfer contract generated based on the identification information and/or configuration information in the power transfer phase 640. As a result of monitoring the parameters, if power transmission to the wireless power receiver 200 violates the limits included in the power transfer contract, then the wireless power transmitter 100 may cancel the power transmission and return to the selection phase 610.

The wireless power transmitter 100 may terminate the power transfer phase 640 based on a power control message transferred from the wireless power receiver 200.

For example, if the charging of a battery has been completed while charging the battery using power transferred by the wireless power receiver 200, then a power control message for requesting the suspension of wireless power transfer will be transferred to the wireless power transmitter 100. In this case, the wireless power transmitter 100 may receive a message for requesting the suspension of the power transmission, and then terminate wireless power transfer, and return to the selection phase 610.

For another example, the wireless power receiver 200 may transfer a power control message for requesting renegotiation or reconfiguration to update the previously generated power transfer contract. The wireless power receiver 200 may transfer a message for requesting the renegotiation of the power transfer contract when it is required a larger or smaller amount of power than the currently transmitted power amount. In this case, the wireless power transmitter 100 may receive a message for requesting the renegotiation of the power transfer contract, and then terminate contactless power transfer, and return to the identification and configuration phase 630.

To this end, a message transmitted by the wireless power receiver 200, for instance, may be an end power transfer packet 5600 as illustrated in FIG. 20. The packet 5600 may include a header 5620 for notifying that it is an end power transfer packet and a message 5630 including an end power transfer code indicating the cause of the suspension. The end power transfer code may indicate any one of charge complete, internal fault, over temperature, over voltage, over current, battery failure, reconfigure, no response, and unknown error.

Communication Method of Plural Electronic Devices

Hereinafter, description will be given of a method by which at least one electronic device performs communication with one wireless power transmitter using wireless power signals.

FIG. 19 is a conceptual view illustrating a method of transferring power to at least one wireless power receiver from a wireless power transmitter.

The wireless power transmitter 100 may transmit power to one or more wireless power receivers 200 and 200'. FIG. 19 illustrates two electronic devices 200 and 200', but the methods according to the exemplary embodiments disclosed herein may not be limited to the number of electronic devices shown.

An active area and a detection area may be different according to the wireless power transfer method of the wireless power transmitter 100. Therefore, the wireless power transmitter 100 may determine whether there is a wireless power receiver located on the active area or the detection area according to the resonance coupling method or a wireless power receiver located on the active area or the detection area according to the induction coupling method. According to the determination result, the wireless power transmitter 100 which supports each wireless power transfer method may change the power transfer method for each wireless power receiver.

In the wireless power transfer according to the exemplary embodiments disclosed herein, when the wireless power transmitter 100 transfers power to the one or more electronic devices 200 and 200' according to the same wireless power transfer method, the electronic devices 200 and 200' may perform communications through the wireless power signals without inter-collision.

Referring to FIG. 19, a wireless power signal 10*a* generated by the wireless power transmitter 100 may arrive at the first electronic device 200' and the second electronic device 200, respectively. The first and second electronic devices 200' and 200 may transmit wireless power messages using the generated wireless power signal 10*a*.

The first electronic device 200' and the second electronic device 200 may operate as wireless power receivers for receiving a wireless power signal. The wireless power receiver in accordance with the exemplary embodiments disclosed herein may include a power receiving unit 291', 291 to receive the generated wireless power signal, a modulation/demodulation unit 293', 293 to modulate or demodulate the received wireless power signal, and a controller 292', 292 to control each component of the wireless power receiver.

Foreign Object Detection Method

Hereinafter, a foreign object detection (FOD) method when a foreign object is close to or placed on a wireless power transmitter formed to transmit power to a wireless power receiver in a wireless manner will be described in more detail with reference to the accompanying drawings.

FIG. 20 is a circuit diagram schematically illustrating part of the configuration of a wireless power transmitter in a magnetic induction mode that can be employed in the embodiments disclosed in the present disclosure. Referring to the block diagram of a wireless power transmitter in FIGS. 4A and 7A, the circuit diagram of FIG. 20 may further include a capacitor 1111c in addition to the power supply unit 190, inverter 1112 and transmitting coil 1111a disclosed in FIGS. 4A and 7A.

According to the drawing, the power supply unit 190 is electrically connected to the inverter 1112. For example, the power supply unit 190 provides a DC input to the transmitter 100, and the DC input is provided to the inverter 1112 of the transmitter 100 and converted into an AC waveform.

The inverter 1112 performs half-wave rectification or full-wave rectification on the current to convert a DC current to an AC current.

The inverter 1112 displays a signal for detecting whether or not a foreign object is placed on the wireless power transmitter 100. More specifically, the inverter 1112 may receive a pulse width modulation (PWM) signal generated for a reference period of time (?T1) to output a half-wave rectified or full-wave rectified signal and transmit it to the transmitting coil 1111a to detect whether or not a foreign object is placed on the wireless power transmitter 100.

The transmitting coil 1111a converts the half-wave rectified or full-wave rectified current outputted from the inverter 1112 into a magnetic flux. The transmitting coil 1111a transmits power to the receiving coil 2911b of the receiver 200 illustrated in FIGS. 4B and 7B in a wireless manner, and thus power is transferred by inducing a current to the side of the receiving coil 2911b through a magnetic field changing on the transmitting coil 1111a due to a magnetic induction phenomenon.

The capacitor 1111c is disposed between the transmitting coil 1111a and the inverter 1112, and configured to generate a resonant frequency in Equation 1 presented in the above based on an inductance of the transmitting coil 1111a and its own capacitor to determine a resonant frequency of the transmitter.

The transmitter having the foregoing capacitor 1111c is configured to detect that a foreign object other than a receiver is placed on the transmitter. Hereinafter, the detection process will be described with reference to FIGS. 21 and 22.

FIGS. 21 and 22 are flow charts illustrating a foreign object detection method of a wireless power transmitter in a magnetic induction mode that can be employed in the embodiments disclosed in the present disclosure. The foreign object detection method is carried out by the power transmission control unit 112 of the transmitter illustrated in FIGS. 4A and 7A.

The foreign object detection method of FIG. 21 may include an analog ping phase 2100, a frequency characteristic acquisition phase 2200 for a current flowing through a transmitting coil, a digital ping phase 2300, an identification and configuration phase 2400, and a power transfer phase 2500.

Referring to FIG. 21, the identification and configuration phase 2400 and power transmission phase 2500 corresponds to the identification and configuration phase 630, and the power transfer phase 640 in FIG. 13, respectively. Accordingly, the description of the identification and configuration phase 2400 and power transmission phase 2500 will be substituted by the foregoing description of the identification and configuration phase 630 and power transfer phase 640.

The analog ping phase 2100 in FIG. 21 may include an analog ping signal transfer phase 2110 and a current comparison phase 2120 as illustrated in FIG. 22.

The transmitter transmits an analog ping signal to the receiver during the analog ping signal transfer phase 2110.

During this phase, it may be determined whether or not a receiver or foreign object is placed on a transmitter. Such a determination is performed through the comparison of a current, and thus the current comparison phase is carried out subsequent to the transmission of the signal.

More specifically, when a current (Icoil) flowing through the transmitting coil 1111a is greater than a first threshold value (Icoil_thr) (Icoil>Icoil_thr) during the current comparison phase 2120, the transmitter determines that the receiver or foreign object is not placed on the transmitter.

It corresponds to a case where the receiver or foreign object is not placed on the transmitter, wherein the transmitter repeatedly performs the analog ping signal transfer phase 2110 to determine whether or not the receiver or foreign object is placed thereon.

On the other hand, when a current (Icoil) flowing through the transmitting coil 1111a is less than a first threshold value (Icoil_thr) (Icoil<Icoil_thr) during the current comparison phase 2120, the transmitter determines that the receiver or foreign object is placed on the transmitter.

Furthermore, the transmitter performs the frequency characteristic acquisition phase 2200 to determine whether the receiver is placed or the foreign object is placed on the transmitter. The frequency characteristic acquisition phase 2200 may include a frequency domain transformation phase 2210, a current comparison phase 2220, and a resonant frequency comparison phase 2230.

The frequency domain transformation phase 2210 transforms a time domain value of a current flowing through the transmitting coil 1111a to a frequency domain value for a predetermined period of time (?T2) to acquire a frequency characteristic of the current.

The current comparison phase 2220 determines that the receiver and the foreign object are not placed on the transmitter when a peak value (Icoil_peak) of the current is greater than a second threshold value (Icoil_thr).

It corresponds to a case where the receiver or foreign object is not placed on the transmitter, wherein the transmitter repeatedly performs the analog ping signal transfer phase 2110 to determine whether or not the receiver or foreign object is placed thereon.

On the other hand, when a peak value (Icoil_peak) of the current is less than a second threshold value (Icoil_thr) during the current comparison phase 2220, it is determined that that the receiver or the foreign object is placed on the transmitter.

Furthermore, the transmitter performs the resonant frequency comparison phase 2230 to determine whether the receiver is placed or the foreign object is placed on the transmitter. The resonant frequency comparison phase 2230 may be a phase for determining whether what is placed on the transmitter is the receiver or the foreign object.

The resonant frequency comparison phase 2230 detects a peak frequency (Freqpeak) corresponding to a peak value using the acquired frequency characteristic, and compares the peak frequency (Freqpeak) with a resonant frequency (Freqoffset_thr) of the wireless power transmitter. When a difference between the peak frequency (Freqpeak) and the resonant frequency (Freqoffset_thr) is greater than a threshold frequency (Freqoffset_thr) which is a frequency tolerance for determining that the receiver is placed thereon (Fp−Fr>Foffset_thr), it is determined that the foreign object is placed on the transmitter.

It corresponds to a case of abnormal operation, and the transmitter does not perform the digital ping phase 2300, identification and configuration phase 2400 and power transmission phase 2500 for transmitting power to the receiver in a wireless manner.

In this case, another phase for solving the abnormal operation may be carried out instead of performing each phase for transmitting power to the receiver in a wireless manner.

For such an example, in order to notify such an abnormal operation to the user, the transmitter may display it on the transmitter or generate a notification signal. Furthermore, the transmitter may transmit the notification signal to a device that controls the transmitter using out-of-band communication or transmit it to the receiver using in-band or out-of-band communication.

On the other hand, during the resonant frequency comparison phase 2230, when a difference between the peak frequency (Freqpeak) and the resonant frequency (Freqoffset_thr) is less than a threshold frequency (Freqoffset_thr) which is a frequency tolerance for determining that the receiver is placed thereon (Fp−Fr>Foffset_thr), it is determined that the receiver is placed on the transmitter.

It corresponds to a case of normal operation, and the transmitter performs the digital ping phase 2300, identification and configuration phase 2400 and power transmission phase 2500 for transmitting power to the receiver in a wireless manner.

During the digital ping phase 2300, the wireless power transmitter forms a wireless power signal for detecting the wireless power receiver 200, demodulates a wireless power signal modulated by the wireless power receiver 200, and acquires a power control message in a digital data format corresponding to a response to the detection signal from the demodulated wireless power signal. The wireless power transmitter may receive a power control message corresponding to a response to the detection signal to recognize the wireless power receiver 200, which is a subject of power transfer.

The description of the identification and configuration phase 2400 and power transmission phase 2500 will be substituted by the foregoing description of the identification and configuration phase 630 and power transfer phase 640 with reference to FIG. 13.

FIGS. 23A and 23B are views illustrating the time and frequency characteristics of a current within a transmitting coil, respectively, in a wireless power transmitter according to the present disclosure.

Referring to FIGS. 20 and 23A, a predetermined period of time (?T2=T2−T0) for acquiring the frequency characteristic of a current flowing through the transmitting coil 1111a should be greater than a reference period of time (?T1=T1−T0) during which a pulse width modulation signal is applied to the transmitting coil 1111a.

In other words, when a pulse width modulation signal is applied to the inverter 1112 for the reference period of time (?T1), a current flowing through the transmitting coil 1111a should be measured for the predetermined period of time (?T2) larger than the reference period of time.

FIG. 23B illustrates the frequency characteristic of a current flowing through the transmitting coil 1111a in a case where a receiver and a foreign object are not placed on the transmitter (TX only), a case where a receiver is placed thereon (TX+RX), a case where a receiver and a foreign object are placed thereon (TX+RX+F0), a case where a receiver is placed to be separated therefrom (TX+gap+RX), and a case where a foreign object is placed thereon (TX+F0). According to an embodiment, it is illustrated the frequency characteristic of a current flowing through the transmitting coil 1111a for a frequency band of 80-120 kHz.

As illustrated in FIG. 23B, when a foreign object is placed thereon (TX+RX+F0, TX+F0), it is seen that the peak frequency moves to a frequency higher than 100 kHz, which is a resonant frequency. Here, the resonant frequency is set to 100 kHz, which is a resonant frequency of the wireless power transmitter (TX only), but may be also of course set to a frequency moved to a frequency band lower than 100 kHz when a receiver is placed thereon (TX+RX).

FIGS. 24A and 24B are views illustrating the frequency characteristics of a current within a transmitting coil in a wireless power transmitter for a low and medium power receiver. FIG. 24A illustrates the frequency characteristic of a low power receiver (RX), and FIG. 24B illustrates the frequency characteristic of a medium power receiver (RX).

As illustrated in FIG. 24A, when a foreign object is placed thereon (TX+RX+F0, TX+F0), it is easily determined that the foreign object is placed thereon since all the peak frequencies move above 115 kHz and have a large difference from 100 kHz, which is the resonant frequency. In addition, it is easily determined that the foreign object is placed thereon since a peak value of the current in case where the foreign object is placed thereon (TX+RX+F0, TX+F0) is greater than that of the current in case where the receiver is placed thereon (RX+RX, TX+gap+RX).

As illustrated in FIG. 24B, in case of a medium power receiver, in a case where both a receiver and a foreign object are placed thereon (TX+RX+F0), it may not be easily determined compared to a case where only a foreign object is placed thereon (TX+F0) since the displacement of the peak frequency to a high frequency band is not so large compared to that of the resonant frequency. However, even in a case where only a foreign object is placed thereon (TX+F0), it may be of course determined that the foreign object is placed thereon since the current peak value thereof is sufficiently large to be distinguished from that of a case where a receiver is placed thereon (TX+RX, RX+gap+RX).

Through this, the present disclosure may easily determine that a foreign object is placed thereon in a wireless power transmitter performing communication with one or more wireless power receivers.

Interference Avoidance Method in Wireless Power Transmitter

Hereinafter, an interference avoidance method of a wireless power transmitter formed to transmit power to a wireless power receiver in a wireless manner, and a wireless charging system including an automobile provided with the wireless power transmitter and a head unit will be described in more detail with reference to the accompanying drawings.

FIG. 25 is a block diagram illustrating a wireless charging system including an automobile provided with a wireless power transmitter formed to transmit power to a wireless power receiver in a wireless manner and a head unit.

When the transmitter 100 transmits a wireless charging signal to the receiver 200, the wireless charging signal may cause interference on communication signals between the head unit 300 and a communication device 400 located in the automobile.

For example, the communication device 400 corresponds to a keyfob for starting an automobile, and a frequency of the wireless charging signal is 111 kHz, and a frequency of the first communication signal (HF) from the head unit 300 to the communication device 400 is 314, 434, 868 or 915 MHz.

A frequency of the second communication signal (LF) from the communication device 400 to the head unit 300 is 125 kHz, and a frequency of the wireless charging signal is 111 kHz, and thus the frequency bands of the wireless charging signal and the second communication signal (LF) may be close to each other, thereby causing mutual interference.

As a result, according to the present disclosure, a method of avoiding the interference of the transmitter 100 without electromagnetically shielding the transmitter 100 when the communication device 400 is at a distance close to the transmitter 100 located in an automobile, and a wireless charging system including an automobile provided with the transmitter 100 and the head unit 300 will be described.

Hereinafter, a specific method of avoiding interference between a communication signal and a wireless charging signal among a head unit, a communication device, a wireless power transmitter and a wireless power receiver in the wireless charging system will be described as follows.

FIG. 26 illustrates a series of processes for avoiding interference between a wireless charging signal and a communication signal in a transmitter according to the present disclosure, and FIG. 27 illustrates a specific process in an interference avoidance step during the series of processes for avoiding interference between a wireless charging signal and a communication signal in the transmitter and head unit according to the present disclosure.

On the other hand, FIG. 28 is a signal flow diagram between a head unit, a communication device, a wireless power transmitter and a wireless power receiver in a wireless charging system.

Referring to FIG. 26, the transmitter 100 performs a wireless connection phase 2610, an interference avoidance phase 2620, and a restoration phase 2630.

Referring to FIGS. 26 and 28, during the wireless connection phase 2610, the transmitter 100 is connected to the head unit 300 through a communication device in a wireless manner.

According to an embodiment, the communication device between the transmitter 100 and the head unit 300 may be out-of-band communication. For example, the out-of-band communication may be Bluetooth Low Energy (BLE) corresponding to an ISM band (2.4 GHz), WiFi Direct or the like. Wireless connection due to the communication device maintains an always-on state or is carried out by a method of performing automatic search when the counterpart device exists within a predetermined distance.

Subsequent to performing the wireless connection phase 2610, the transmitter 100 may transmit and receive wireless signals to and from the head unit to execute various control operations. For example, the transmitter 100 may request information required for a wireless charging operation, such as the status of a main battery in a vehicle, to the head unit.

For another example, the transmitter may receive various information required to more efficiently perform a wireless charging operation from the head unit. More specifically, information on a signal causing interference with wireless charging may be received from the head unit, and using this, the transmitter may execute control for avoiding interference with wireless charging. For such an example, the interference avoidance phase 2620 may be carried out.

For an example of a subject of the interference avoidance, wireless signals transmitted and received while starting a vehicle and what is interfered with the wireless charging may be avoided. More specifically, the head unit may sense a start button being pressed to perform communication with a keyfob to authenticate the user when the start button is pressed. In this case, signals for communication with the keyfob may be a subject of the interference avoidance.

However, the present disclosure may not be necessarily limited to this, signal processing for turning off the start of a vehicle, signal processing for supplying power to part of the elements of a vehicle, or the like may be a subject of the interference avoidance.

Hereinafter, such an interference avoidance phase will be described in more detail with reference to the accompanying drawings.

Referring to FIGS. 26 and 28, during the interference avoidance phase 2620, the transmitter 100 receives a first signal for avoiding interference from the head unit 300 to stop wireless charging or convert a first frequency band of the wireless charging to a second frequency band which is a different frequency band.

Referring to FIGS. 26 and 28, during the restoration phase 2630, the transmitter 100 receives a second signal from the head unit 300 to proceed with the stopped wireless charging or change a wireless charging frequency band of the second frequency band to the first frequency band.

In this manner, the transmitter performs a wireless charging operation in a more efficiently manner through the process of restoration subsequent to interference avoidance.

For more specific example, referring to FIG. 27, the interference avoidance phase 2620 may include a first signal reception phase 2621, a wireless charging signal control phase 2622, a complete signal transmission phase 2623 and a communication execution phase 2625.

Referring to FIG. 28, when the head unit 300 senses a start button being pressed to transmit a first signal to the transmitter 100 during the first signal reception phase 2621, the transmitter 100 receives the first signal from the head unit 300. Upon receiving the first signal, the transmitter may be in a state that the operation of wireless charging is being carried out. For such an example, power is supplied from the main battery of the vehicle to the transmitter, and an inductive magnetic field for wireless charging is generated from the transmitter, and the receiver, for example, mobile terminal, converts the inductive magnetic field to an inductive current to receive power in a wireless manner. In this case, the mobile terminal may be placed on a base station of the transmitter.

During the wireless charging signal control phase 2622, the transmitter 100 stops wireless charging with the receiver 200 or changes a first frequency band of the wireless charging to a second frequency band which is a different frequency band.

According to a method of stopping wireless charging in an embodiment, the head unit 300 may control the supply of power provided from an automobile to the transmitter 100 to be stopped.

According to a method of stopping scheme of a touch input to the display unit in another embodiment, referring to FIGS. 4A and 7A, the power transmission control unit 112 within the transmitter 100 controls the supply of power provided from the power supply unit 190 to the power conversion unit 111 to be stopped.

According to a method of changing to a second frequency in an embodiment, referring to FIG. 7A, the power transmission control unit 112 controls the resonant circuit 1116 or frequency adjustment unit 1117 to change a resonant frequency from the first frequency to the second frequency.

During the complete signal transmission phase 2623, the transmitter 100 stops wireless charging with the receiver 200 or transmits a complete signal to the head unit 300 in response to the first signal subsequent to changing a first frequency band of the wireless charging to a second frequency which is a different frequency band. For example, the complete signal may be an out-of-band communication signal.

During the communication execution phase 2625, the head unit 300 performs communication with the communication device 400 subsequent to receiving the complete signal from the transmitter 100. Referring to FIG. 20, a frequency of the wireless charging signal may be changed from 111 kHz to a frequency sufficiently separated from 125 kHz, which is a frequency of the second communication signal (LF), thereby avoiding interference between the wireless charging signal and the second communication signal (LF).

Referring to FIGS. 26 and 28, during the restoration phase 2630, the transmitter 100 resumes the wireless charging or changes the second frequency band to the first frequency band.

Referring to FIG. 28, the restoration phase 2630 may include a second signal reception phase 2631 and a wireless charging signal restoration phase 2632.

During the second signal reception phase 2631, subsequent to completing communication between the head unit 300 and the communication device 400 (e.g. subsequent to starting an automobile), the transmitter 100 receives a second signal notifying that communication with the communication device 400 has been completed and interference is no longer generated from the head unit 300.

During the wireless charging signal restoration phase 2632, the transmitter may resume the wireless charging based on the received second signal or change a frequency band of the wireless charging signal from a second frequency band to a first frequency band.

According to a method of resuming wireless charging in an embodiment, the head unit 300 may control power to be supplied from an automobile to the transmitter 100.

According to a method of stopping wireless communication in another embodiment, referring to FIGS. 4A and 7A, the power transmission control unit 112 within the transmitter 100 may control power provided from the power supply unit 190 to the power conversion unit 111 to be supplied.

According to a method of changing to the first frequency in an embodiment, referring to FIG. 7A, the power transmission control unit 112 controls the resonant circuit 1116 or frequency adjustment unit 1117 to change a resonant frequency from the second frequency to the first frequency.

For example, a wireless communication frequency band may be 110 to 300 kHz, and the first frequency band may be 110 to 220 kHz which is a frequency band under 220 kHZ, and the second frequency band may be 220 to 300 kHz which is a frequency band above 220 kHz sufficiently separated from 125 kHz that is a communication frequency band.

Hereinafter, in order to allow a wireless power transmitter to avoid interference from peripheral devices according to the present disclosure, the configuration of the wireless power transmitter for implementing an interference avoidance method in FIGS. 26 through 28 will be described.

FIG. 29 is a circuit diagram illustrating a wireless charging system including a wireless power transmitter and a wireless power receiver according to an embodiment of the present disclosure. The transmitter 100 may include a power conversion unit 111, a power transmission control unit 112 and a power supply unit 190.

The power conversion unit 111 converts power supplied from the power supply unit 190 to a wireless power signal to transfer it to the receiver.

The power transmission control unit 112 controls the wireless power signal to allow the power conversion unit 111 to transfer the wireless power signal to the receiver.

The power supply unit 190 provides a DC input to the transmitter 100, and the DC input is provided to the inverter 1112 of the transmitter 100 and converted into an AC waveform.

The power conversion unit 111 may include an inverter 1112, a first resonator 2210, and a second resonator 2220.

The inverter 1112 performs half-wave rectification or full-wave rectification on the current to convert a DC waveform into an AC waveform, and outputs the half-wave rectified or full-wave rectified signal to transmit it to the first resonator 2210.

According to the drawing, the first resonator 2210 may include a transmitting coil (L1) and a capacitor (C1) electrically connected to the transmitting coil (L1). For example, the capacitor (C1) is connected in series to the transmitting coil (L1).

The transmitting coil (L1) converts the half-wave rectified or full-wave rectified current outputted from the inverter 1112 into a magnetic flux. The transmitting coil (L1) transmits power to a receiving coil (L2) of the receiver in a wireless manner, and a current is induced to the side of the receiving coil (L2) through a magnetic field changed in the transmitting coil (L1) due to a magnetic induction phenomenon to transfer power.

The capacitor (C1) is disposed between the transmitting coil (L1) and the inverter 1112, and configured to generate a first resonant frequency such as Equation 1 presented in the above based on an inductance of the transmitting coil (L1) and its own capacitance to determine a first resonant frequency of the transmitter.

According to the drawing, the second resonator 2220 may include a capacitor (Cf) and an inductor (Lf) electrically connected to the capacitor (Cf). For example, the capacitor (Cf) is connected in parallel to the transmitting coil (L1), and the inductor (Lf) is connected in series to the capacitor (Cf).

The capacitor (Cf) is preferably removed to increase power efficiency during wireless charging, but should have a suitable capacitance value to change the resonant frequency so as to avoid interference.

For example, the capacitance of the capacitor (Cf) should have a value of 400 nF according to the A13 specification. However, in order to increase power efficiency, the capacitor may be removed, and more preferably have a value of 200 nF in the second frequency band to avoid interference.

The inductor (Lf) is configured to generate a second resonant frequency such as Equation 1 presented in the above based on its own inductance and a capacitance of the capacitor (Cf) to determine a second resonant frequency of the transmitter.

When the first resonator 2710 and second resonator 2720 are connected to each other in parallel as illustrated in FIG. 29, the transmitter transmits power in a wireless manner at a resonant frequency different from the first resonant frequency and second resonant frequency. For example, the resonant frequency is determined by inductances (L1, Lf) and capacitances (C1, Cf) of the first resonator 2710 and second resonator 2720.

On the other hand, a combination of the inductances (L1, Lf) and capacitances (C1, Cf) of the first resonator 2710 and second resonator 2720 may not be necessarily limited to a specific combination of FIG. 24, and also configured with various combinations in series or parallel of the inductances (L1, Lf) and capacitances (C1, Cf).

On the other hand, the power receiving unit 291 of the receiver receives power transmitted from the transmitter in a wireless manner. The power receiving unit 291 may include a receiving coil (L2), a capacitor (C2) electrically connected to the receiving coil (L2), a resistor (R2) electrically connected to the capacitor (C2), a capacitor (Cm) electrically connected to the resistor (R2), and a load resistor (RL) electrically connected to the capacitor (Cm).

For example, the capacitor (C2) is connected in series to the receiving coil (L2), and the resistor (R2) is connected in series to the capacitor (C2), and the capacitor (Cm) is connected in parallel to the resistor (R2), and the load resistor (RL) is connected in parallel to the capacitor (Cm).

The receiving coil (L2) receives power from the transmitting coil (L1) in a wireless manner, and a current is induced to the side of the receiving coil (L2) through a magnetic field changed in the transmitting coil (L1) due to a magnetic induction phenomenon to transfer power.

The capacitor (C2) is configured to generate a resonant frequency such as Equation 1 presented in the above based on an inductance of the transmitting coil (L2) and its own capacitance to determine a resonant frequency of the receiver.

The capacitor (Cm) corresponds to an internal capacitance of the receiver, and the resistor (R2) corresponds to an internal resistance of the receiver 200, generating a voltage drop due to the internal resistance and a current induced to the receiver.

On the other hand, when there is no internal loss in the receiver, the receiver may include the receiving coil (L2), the capacitor (C2) and the load resistor (RL) without the capacitor (Cm) and the resistor (R2).

The load resistor (RL) corresponds to an external resistance of the receiver, generating a voltage drop due to the external resistance and a current induced to the receiver.

The configuration of circuit elements in the receiver is configured to generate a resonance phenomenon to receive a wireless charging signal transmitted by a magnetic field formed in the transmitter. In other words, the present disclosure may not be necessarily limited to a specific form of combination of the receiving coil (L2) and capacitor (C2) in series or parallel, and also configured with various combinations in series or parallel.

Here, the receiver should be chargeable in both the first frequency band and second frequency band, which is a resonant frequency during wireless charging.

Referring to FIG. 7B, the power receiving control unit 292 may transmit a control signal to the resonant circuit 2912 to change a resonant frequency from the first frequency band to the second frequency band.

Referring to FIGS. 7 and 27, the resonant frequency of the resonant circuit 2912 is determined by a receiving coil (L2) and a capacitor (Cm) connected in parallel to the receiving coil (L2).

For example, the capacitor (Cm) may be implemented with a variable capacitor having a different capacitance value in the first frequency band and second frequency band in order to change the resonant frequency from the first frequency band to the second frequency band.

Hereinafter, another configuration of a wireless power transmitter for implementing the interference avoidance method in FIGS. 26 through 28 to allow the wireless power transmitter to avoid interference from peripheral devices will be described.

FIG. 30 is a circuit diagram illustrating a wireless power transmitter according to another embodiment of the present disclosure. The transmitter may include a power conversion unit 111, a power supply unit 190, and a power transmission control unit 112. Here, the power conversion unit 111, power supply unit 190 and power transmission control unit 112 correspond to the relevant blocks in FIG. 24, and thus the description thereof will be substituted by the description of FIG. 29.

On the other hand, the power conversion unit 111 may include an inverter 1112, a first resonator 2710, and a second resonator 2720. Here, the inverter 1112 and the first resonator 2210 correspond to the relevant blocks in FIG. 24, and thus the description thereof will be substituted by the description of FIG. 29.

Referring to FIG. 30, the second resonator 2720 may further include an inductor (Lf), a capacitor (Cf), and a switch (SW) for electrically turning on or off the capacitor (Cf). Here, the description of the inductor (Lf) and capacitor (Cf) will be substituted by the description of FIG. 29.

On the other hand, a transmitter in FIG. 30 including a resonator having the switch (SW) performs the wireless connection phase 2610, interference avoidance phase 2620 and restoration phase 2630 as presented in FIG. 21, and the detailed procedure thereof will be described below.

During the wireless connection phase 2610, the power transmission control unit 112 is connected to a head unit of the automobile through a communication device in a wireless manner.

During the interference avoidance phase 2620, the power transmission control unit 112 receives a first signal to avoid interference from the head unit to stop wireless charging or change a first frequency band of the wireless charging to a second frequency band, which is a different frequency band, based on the first signal.

In connection with the interference avoidance phase 2620, the power transmission control unit 112 controls the switch (SW) such that the switch (SW) is to be in an open state to increase power efficiency when the transmitter is desired to operate in a first frequency band.

In connection with the interference avoidance phase 2620, the power transmission control unit 112 controls the switch (SW) such that the switch (SW) is to be in a closed state to avoid interference when the transmitter 100 is desired to operate in a second frequency band.

When the switch (SW) is in an open state, it has the same electrical structure as that in which the capacitor (Cf) is removed from the first frequency band, thereby obtaining a power efficiency improvement effect.

On the contrary, when the switch (SW) is in a closed state, the resonant frequency may be moved from the first frequency band to the second frequency band due to a capacitance of the capacitor (Cf), thereby obtaining an interference avoidance effect from control signals close to the first frequency band between a head unit of the automobile and a communication device within the automobile.

During the restoration phase 2630, the power transmission control unit 112 receives a second signal from the head unit to resume the wireless charging or change the second frequency band to the first frequency band.

FIGS. 31A and 31B illustrate the operation or non-operation of a receiver according to a frequency change and load resistance change when a switch is in an off state and on state, respectively. Here, symbol "o" corresponds to a case where the receiver operates normally, and symbol "x" corresponds to a case where the receiver does not operate normally.

When the switch is in an off state in FIG. 31A, it is seen that the receiver does not operate normally even at a frequency of 220 kHz corresponding to the second frequency band when the load resistance above a specific value is connected thereto.

On the contrary, when the switch is in an on state and a value of the capacitor (Cf) is 200 nF in FIG. 31B, it is seen that the receiver operates normally regardless of the load resistance in a frequency band above 220 kHz corresponding to the second frequency band. It denotes that wireless power transfer is allowed regardless of interference due to communication signals from the communication device or head unit.

However, it would be easily understood by those skilled in the art that the configuration of a wireless power transmitter according to the embodiments disclosed herein may be also applicable to an apparatus, such as a docking station, a terminal cradle device, and an electronic device, and the like, excluding a case where it is applicable to only a wireless charger.

The scope of the invention will not be limited to the embodiments disclosed herein, and thus various modifications, variations, and improvements can be made in the present invention without departing from the spirit of the invention, and within the scope of the appended claims.

The invention claimed is:

1. A foreign object detection method of a wireless power transmitter formed to transmit power to a wireless power receiver in a wireless manner, the method comprising:
    transmitting an analog ping signal to the wireless power receiver;
    acquiring frequency characteristics of a current flowing through a coil within the wireless power transmitter for a predetermined period of time by transforming a time domain value of the current to a frequency domain value;
    determining whether or not a peak value of the current is less than a second threshold value at a resonant frequency, wherein neither the wireless power receiver nor the foreign object are determined to be placed on the wireless power transmitter when the peak value of the current is greater than the second threshold value;
    detecting a peak frequency corresponding to the peak value of the current in the frequency domain using the acquired frequency characteristics, and comparing the peak frequency with the resonant frequency of the wireless power transmitter, when the peak value of the current is less than the second threshold value; and
    determining that the foreign object is placed thereon when a difference between the peak frequency and the resonant frequency is above a frequency tolerance for determining that the receiver is placed thereon.

2. The method of claim 1, further comprising:
    determining that the foreign object is not placed thereon when the current flowing through the coil is above a first threshold value, after transmitting the analog ping signal to the wireless power receiver.

3. The method of claim 1, wherein when the wireless power receiver is a low power receiver, the foreign object is determined to be placed thereon when the difference between the peak frequency and the resonant frequency is above the frequency tolerance for determining that the wireless power receiver is placed thereon.

4. The method of claim 1, further comprising:
    transmitting a digital ping signal to the receiver subsequent to detecting that the foreign object is placed thereon.

5. The method of claim 1, wherein the current flowing through the coil is generated by a pulse width modulation (PWM) signal applied to an inverter within the transmitter, and the PWM signal is generated for a reference period of time, and the reference period of time is shorter than the predetermined period of time.

6. A wireless power transmitter formed to transmit power to a wireless power receiver in a wireless manner, the wireless power transmitter comprising:
    a power conversion unit configured to provide a wireless power signal to the wireless power receiver; and
    a power transmission control unit configured to control the wireless power signal,
    wherein the power transmission control unit performs:
    controlling an analog ping signal to be transmitted to the wireless power receiver;
    acquiring frequency characteristics of a current flowing through a coil within the wireless power transmitter for a predetermined period of time by transforming a time domain value of the current to a frequency domain value;
    determining whether or not a peak value of the current is less than a second threshold value at a resonant frequency, wherein neither the wireless power receiver nor the foreign object are determined to be placed on the wireless power transmitter when the peak value of the current is greater than the second threshold value;
    detecting a peak frequency corresponding to the peak value of the current in the frequency domain using the acquired frequency characteristics, and comparing the peak frequency with the resonant frequency of the wireless power transmitter, when the peak value of the current is less than the second threshold value; and
    determining that the foreign object is placed thereon when a difference between the peak frequency and the resonant frequency is above a frequency tolerance for determining that the receiver is placed thereon.

7. The wireless power transmitter of claim 6, wherein the power transmission control unit further performs:
    determining that the foreign object is not placed thereon when the current flowing through the coil is above a first threshold value, after controlling the analog ping signal to be transmitted to the wireless power receiver.

8. The wireless power transmitter of claim 6, wherein the power conversion unit further comprises:
    an inverter connected to a capacitor to convert a DC input supplied from a power supply unit into an AC waveform, and configured to generate a pulse width modulated signal for a reference period of time to transfer it to the coil,
    wherein the reference period of time is shorter than the predetermined period of time.

9. The wireless power transmitter of claim 6, wherein the power conversion unit comprises:
    a coil formed to convert the current into a magnetic flux; and
    a capacitor disposed between the coil and inverter, and configured to generate the resonant frequency based on an inductance of the coil and its own capacitance, and
    wherein a current flowing through the coil is generated by a pulse width modulation (PWM) signal applied to the inverter within the transmitter.

* * * * *